United States Patent [19]

Tsukagoshi

[11] Patent Number: 5,563,660
[45] Date of Patent: Oct. 8, 1996

[54] DECODER FOR A COMPRESSED DIGITAL VIDEO SIGNAL USING A COMMON MEMORY FOR DECODING AND 2/3 PULL-DOWN CONVERSION

[75] Inventor: Ikuo Tsukagoshi, Tokyo, Japan

[73] Assignee: Sony Corporation, Tokyo, Japan

[21] Appl. No.: 159,864

[22] Filed: Nov. 30, 1993

[30] Foreign Application Priority Data

Nov. 30, 1992 [JP] Japan .................................. 4-343515

[51] Int. Cl.⁶ .................................................. H04N 7/32
[52] U.S. Cl. .................................................. 348/384
[58] Field of Search .......................... 348/97, 99, 413, 348/415, 416, 401, 423, 96, 187, 699, 700, 439, 440, 448, 452; H04N 7/137

[56] References Cited

U.S. PATENT DOCUMENTS

| | | | |
|---|---|---|---|
| 4,633,293 | 12/1986 | Powers | 348/97 |
| 4,881,125 | 11/1989 | Krause | 348/448 |
| 4,901,161 | 2/1990 | Giovanella et al. | 348/96 |
| 4,982,280 | 1/1991 | Lyon et al. | 348/97 |
| 4,998,167 | 3/1991 | Jaqua | 348/469 |
| 4,998,287 | 3/1991 | Katznelson et al. | 348/97 |
| 5,174,641 | 12/1992 | Lim | 348/438 |
| 5,187,575 | 2/1993 | Lim | 348/555 |
| 5,317,398 | 5/1994 | Casavant et al. | 348/700 |
| 5,337,154 | 8/1994 | Dorricott et al. | 348/97 |
| 5,461,420 | 10/1995 | Yonemitsu et al. | 348/401 |

FOREIGN PATENT DOCUMENTS

WO91/13520  9/1991  WIPO .............. H04N 11/06

OTHER PUBLICATIONS

"Applications of Motion Compensation To Standards Commension and Film Transfer", B R Mason & R N Robinson, Vistek Electronics Limited, UK, pp. 390–394.
"Motion' Compensated Frame Rate Conversion of Motion Pictures," R L Lagendijk and M I Sezan, © 1992, IEEE, pp. III453–III456.
"DigiCipher HDTV System Description," General Instrument Corporation, San Diego, Aug. 22, 1991, pp. 9–23.

Primary Examiner—Tommy P. Chin
Assistant Examiner—Vu Le
Attorney, Agent, or Firm—Limbach & Limbach L.L.P.

[57] ABSTRACT

An apparatus for expanding a compressed digital video signal representing a motion picture to provide a digital video output signal. The compressed digital video signal comprises plural interlaced frames with a frame rate of 24 Hz. The digital video output signal comprises plural pictures with a picture rate of at least 49 Hz. The apparatus includes a frame memory comprising no more than four pages, each page storing one frame. The apparatus also includes an expander for expanding the compressed digital video signal to derive a reconstructed interlaced frame from each frame of the compressed digital video signal. Finally, the apparatus includes a controller that controls writing of each reconstructed interlaced frame into one page of the frame memory. The controller also controls reading out of the reconstructed interlaced frames stored in the pages of the frame memory to provide the pictures of the digital video output signal. Reading out is controlled to effect 2-3 pull down conversion of the reconstructed interlaced frames stored in the frame memory with a frame rate of 24 Hz to provide the pictures of the digital video output signal with a picture rate of at least 49 Hz.

24 Claims, 16 Drawing Sheets

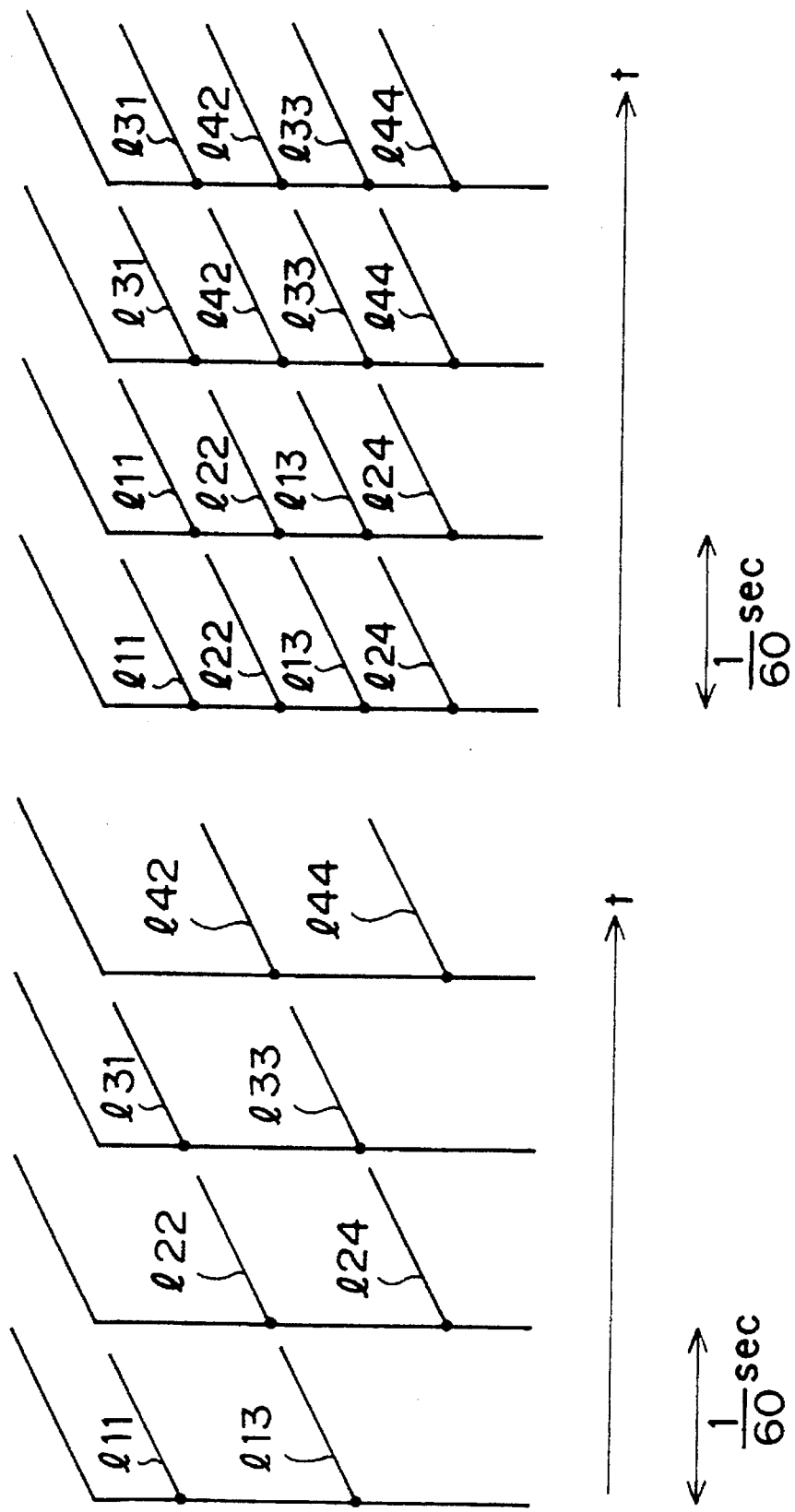

1

DECODER FOR A COMPRESSED DIGITAL VIDEO SIGNAL USING A COMMON MEMORY FOR DECODING AND 2/3 PULL-DOWN CONVERSION

FIELD OF THE INVENTION

This invention relates to an apparatus for decoding a compressed interlaced digital video signal having frame rate of 24 Hz to provide a digital video output signal that is either interlaced with a field rate of 60 Hz or is non-interlace with a frame rate of 60 Hz, and in which a single frame memory having four pages, each page storing one frame, is used for the decoding and for picture rate conversion.

BACKGROUND OF THE INVENTION

Since a very large amount of data is required to represent a motion picture digitally, the digital video signal representing the motion picture is conventionally compressed using a high-efficiency compression process to enable the digital video signal to be transmitted, distributed, or stored using significantly less data. FIGS. 1 and 2 respectively show the construction of a known recording apparatus for recording a digital video signal representing a motion picture and of a known reproducing apparatus for reproducing a compressed digital video signal in which the digital video signal is compressed before recording, and the compressed digital video signal is expanded after reproduction.

Specifically, in the recording apparatus 1 shown in FIG. 1 for recording a digital video signal, the analog video signal S1 from a video signal source, such as the video camera (VID CAM) 2, is converted into a digital video signal by the analog-to-digital converter (A/D) 3. The resulting digital video signal D1 is fed into the encoder (ENCODE) 4, where it is compressed. The error correction circuit (ECC) 5 adds error correcting codes to the compressed digital video signal D2 from the encoder 4, and the modulation circuit (MOD) 6 modulates the resulting signal using a predetermined modulating method. The recording signal S2 from the modulation circuit is recorded on the recording medium 7, which is, for example, an optical disk.

In the reproducing apparatus 8 shown in FIG. 2 for reproducing a compressed digital video signal, the signal S3 reproduced from the recording medium 7 is demodulated by the demodulation circuit (DEMOD) 9. The error correcting circuit (ECC) 10 subjects the demodulated signal to error detection and correction to produce the compressed digital video signal D3. The decoder (DECODE) 11 expands the compressed digital video signal D3 from the error correction circuit 10 to produce the digital video output signal D4. The digital-to-analog converter (D/A) 12 converts the digital video output signal D4 to an analog signal for delivery as the analog video signal S4 to the monitor (TV MONI) 13 or the like for display. Alternatively, the digital video output signal D4 can be delivered to the monitor 13 directly.

FIG. 3 shows the construction of the encoder 4 of the recording apparatus 1 in detail. The encoder 4 receives the digital video signal D1 and stores it in the frame memory (FRM MEM) 20, which consists of a random-access memory (RAM). The digital video signal is read out from the frame memory 20 at a predetermined timing and is fed via the block dividing circuit 21 to the subtractor 22 and one pole of the switch 32. The other pole of the switch 32 is connected to the output of the subtractor 22. The wiper of the switch 32 is connected and the subtractor 22 to the orthogonal transform circuit 23, which is, for example, a discrete cosine transform (DCT) circuit. Depending on the state of the switch 32, the orthogonal transform circuit 23 orthogonally transforms a block of the digital video signal D1 or a block of differences between a block of the digital video signal and a corresponding reference block. The orthogonally transform circuit applies, for example, a discrete cosine transform (DCT). The resulting transform coefficients are quantized by the quantizing circuit (Q) 24. The variable length coding circuit (VLC) 25 codes the quantized transform coefficients using variable length coding such as Huffman coding. The resulting digital video data DO are fed to the video output buffer 26, where they are temporarily stored.

Each picture (i.e., each frame or each field) of the digital video signal may be coded using intra-picture coding or inter-picture coding. A picture coded using intra-picture coding (called an I-picture) is coded by itself, without reference to any other picture. When a picture is coded as an I-picture, the switch 32 feeds each picture block of the picture directly to the orthogonal transform circuit 23.

A picture coded using inter-picture coding (called a P-picture or a B-picture) is coded with reference to a reference picture, which is derived from one or more previous or following pictures. When a picture is coded using inter-picture coding, the subtractor 22 generates blocks of differences between blocks of the picture and corresponding blocks of the reference picture, and passes each block of differences via the switch 32 to the orthogonal transform circuit 23 for coding.

The reference picture with respect to which the picture is coded is derived from reconstructed I-pictures and P-pictures stored in the frame memory 20 as follows: a P-picture is coded with forward prediction using as its reference picture a temporally-preceding I-picture or P-picture. A B-picture is coded with bi-directional prediction using as its reference picture one of the following three types of pictures: a temporally-preceding I-picture or P-picture; a temporally-following I-picture or P-picture; or a picture formed by interpolation between a temporally-preceding I-picture or P-picture and a temporally-following I-picture or P-picture.

The reconstruction of the reconstructed I-pictures and P-pictures stored in the frame memory 20 will now be described. The block of quantized transform coefficients derived from each block of each I-picture or each P-picture is fed from the quantizing circuit 24 to the local decoder 33. The local decoder is constituted by the inverse quantizer 27, the inverse orthogonal transform circuit 28, and the adder 29. The local decoder 33 decodes each block of quantized transform coefficients to provide a block of a reconstructed picture. The block of the reconstructed picture is then stored in the frame memory 20.

In the local decoder 33, each block of quantized transform coefficients passes from the quantizer 24 to the inverse quantizing circuit (IQ) 27, where it is inversely quantized. Each resulting block of transform coefficients is fed into the inverse orthogonal transform circuit (IDCT) 28, where it is subject to an inverse orthogonal transform, such as an inverse DCT. Each resulting locally-decoded block from the inverse orthogonal transform circuit 28 is supplied to the adder 29, where it is added to its corresponding reference block from the motion compensator 31. The resulting reconstructed picture block is fed into the frame memory 20, where it is stored as a block of a reconstructed picture stored in the memory. When the picture being coded is an I-picture, the motion compensator 31 supplies no reference block to the adder 29, and the reconstructed picture block is derived solely from the locally-decoded block from the inverse orthogonal transform circuit 28.

By the process just described, a reconstructed picture is derived from each I-picture and each P-picture by decoding compressed digital data that are identical to the compressed digital data supplied via the VLC circuit 25 to the video output buffer 26. The reconstituted picture is written into the frame memory 20. The resulting reconstructed pictures stored in the frame memory 20 are then used in coding P-pictures and B-pictures.

When the current picture is coded using inter-picture coding (i.e., is a P-picture or a B-picture), the reference block for coding each block of the picture is generated by the motion compensator 31 in response to the motion detector 30. The motion detector 30 performs block matching between each block of the current picture and the reference picture derived from the reconstructed pictures stored in the frame memory 20. This detects the motion of each block of the current picture relative to the reference picture. The motion detector 30 generates a motion vector representing this motion, and feeds the motion vector to the VLC circuit 25 and to the motion compensator 31. The VLC circuit 25 applies variable-length coding to the motion vector and combines the result with the variable-length coded transform coefficients received from the quantizer 24. The VLC circuit 25 feeds the resulting digital video data to the video output buffer 26.

In response to the motion vector received from the motion detector 30, the motion compensator 31 carries out motion compensation on the reference picture derived from the reconstructed pictures stored in the frame memory 20, and provides the resulting reference block corresponding to the picture block of the current picture to the subtractor 22 and to the adder 29. As described above, the subtractor 22 subtracts the reference block received from the motion compensator 31 from the picture block of the current picture to derive a block of differences for coding, and the adder 29 adds the reference block received from the motion compensator 31 to the locally-decoded block received from the inverse orthogonal transform circuit 28 to generate a block of the reconstructed picture, which it supplies to the frame memory 20 for storage.

The video output buffer 26 monitors the number of bytes of compressed digital video data accumulated therein and adjusts quantizing step size in the quantizing circuit 24 so that the accumulated number of bytes of compressed digital data does not cause the video output buffer to overflow or to underflow. The compressed digital video data stored in the video output buffer 26 are read out at a constant rate, and are delivered to the error correction circuit 5 as the compressed digital video signal D2.

The decoder 11 of the motion picture reproducing apparatus 8 (FIG. 2) is constructed as shown in FIG. 4. The compressed digital video signal D3 is transferred at a constant transfer rate from the error correction circuit (ECC) 10 to the video input buffer 40, where it is stored. The compressed digital video data for each picture are read out from the video input buffer 40, and are supplied to the inverse VLC circuit 41. The inverse variable length coding circuit (inverse VLC circuit) applies inverse VLC coding to the compressed digital data for each picture, and supplies the resulting blocks of quantized transform coefficients to the inverse quantizing circuit (IQ) 42.

After it has finished applying inverse VLC coding to the compressed digital data for each picture, the inverse VLC circuit 41 feeds a request code RQ to the video input buffer 40 to cause the video input buffer to provide the compressed digital data for the next picture. In response to the request code, the video input buffer 40 transfers the compressed digital video data of the next picture to the inverse VLC circuit 41. The transfer rate of this process is the same as the transfer rate from the VLC circuit 25 to the video output buffer 26 in the encoder 4 (FIG. 3), so the video input buffer 40 will neither overflow nor underflow when it receives compressed video data at a constant transfer rate from the storage medium 7. In fact, in the encoder 4, the video output buffer 26 controls the number of bytes of compressed video data accumulated therein by emulating the video input buffer 40 in the decoder 11 such that the video input buffer will neither overflow nor underflow.

In addition to applying inverse VLC coding to the compressed digital data for each picture, the inverse VLC circuit 41 extracts from the compressed digital data the motion vector MV for each block and quantizing step size data SS. The quantizing step size data is generated by the encoder 4 (FIG. 1) and is included in the recording signal recorded on the recording medium 7 for use in dequantizing the quantized transform coefficients in the dequantizer 42 in the decoder 11. The motion vector MV is generated by the motion detector 30 (FIG. 3), and is included in the recording signal recorded on the recording medium 7 for use in the motion compensator 46 in the decoder 11.

The dequantizer 42 dequantizes each block of quantized transform coefficients supplied by the inverse VLC circuit 41 in accordance with quantizing step size data SS extracted from the compressed digital video data by the inverse VLC circuit 41, and supplies each resulting block of transform coefficients to the inverse orthogonal transform (IDCT) circuit 43.

The inverse orthogonal transform circuit 43 applies an inverse orthogonal transform, such as an inverse discrete cosine transform, to each block of transform coefficients supplied by the dequantizing circuit 42 to provide a decoded block. The decoded block is supplied to the adder 44, which also receives the corresponding reference block of the corresponding reference picture derived by the motion compensator 46 from one or more of the reconstructed pictures stored in the frame memory 45. The resulting reconstructed picture block received from the adder 44 is stored in the frame memory 45 as a block of a new reconstructed picture.

If the current picture is an I-picture, the motion compensator 46 provides no reference block to the adder 44, and the reconstructed block is generated using the decoded block alone. If the current picture is a P-picture, having an I-picture or another P-picture as its reference picture, the I-picture or P-picture is copied from the frame memory 45 to the motion compensator 46 as the reference picture for the current picture. The motion compensator 46 applies motion compensation to the reference picture copied from the frame memory 45 in accordance with the motion vector for the current block of the current picture. The motion compensator 46 then provides the resulting block of the reference picture to the adder 44 as the reference block for the current block of the current picture.

The adder 44 adds the decoded block received from the inverse orthogonal transform circuit 43 to the reference block received from the motion compensator 46 to reconstruct the current block of the current P-picture, which is stored in the frame memory 45. This process is then repeated for the remaining blocks of the current P-picture until all of the blocks of the current picture have been reconstructed.

If the current picture is a B-picture, the one or more I-pictures and/or P-pictures are copied from the frame memory 45 to the motion compensator 46, which generates from these pictures, in response to the motion vector for the current block, the reference block for reconstructing the current block. The motion compensator 46 supplies the reference block to the adder 44.

The adder 44 adds the decoded block received from the inverse orthogonal transform circuit 43 to the reference block received from the motion compensator 46 to reconstruct the current block of the current B-picture, which is stored in the frame memory 45. This process is then repeated for the remaining blocks of the current B-picture until all of the blocks of the current picture have been reconstructed.

The current picture stored in the frame memory 45 as just described is read out in line scan order by the scanning address generating circuit (FOSL) 47 addressing the frame memory 45. The resulting digital video output signal D4 is then fed to the monitor 13 (FIG. 2), either directly, or via the digital-to-analog converter 12. After it has been read out, the current picture, if an I-picture or P-picture, remains briefly stored in the frame memory 45 for use in decoding other P- and B-pictures.

In the manner just described, the recording apparatus and the reproducing apparatus reduce the redundancy within each picture by orthogonally transforming square blocks of the picture, and reduce the redundancy between pictures by means of the motion vector and block matching. These two techniques are combined to compress the digital video signal representing the motion picture so that the motion picture may be recorded, transmitted, or distributed using a relatively small amount of data.

A picture rate conversion method known as 2-3 pull-down conversion is used when an interlaced video signal having a field rate of 60 Hz is derived from a motion picture film source, such as a motion picture film, or a 24-frame video signal, by means of a telecine or other apparatus. This method must be used because the interlaced video signal has a picture rate of 60 Hz, i.e., a field rate of 60 Hz, whereas the motion picture film source has a picture rate of 24 Hz, i.e., a frame rate of 24 Hz. In this method, for example as shown in FIGS. 5A and 5B, two fields of the video signal are derived from the first of each two consecutive frames of the motion picture film source, and three fields of the video signal are derived from the second of the two fields of the motion picture film source.

In FIGS. 5A and 5B, FIG. 5A shows four consecutive frames, including the frames 50 and 51, of a motion picture film source having a frame frequency of 24 Hz. Each frame of the motion picture film source is scanned twice to provide an odd field, indicated by solid lines, and an even field, indicated by broken lines, offset from the odd field by one line.

Accordingly, the first two fields of the interlaced video signal are derived from the zero-th motion picture film source frame 50. The odd field produced by scanning the motion picture film source frame 50 provides the zero-th field 52, and the even field produced by scanning the motion picture film source frame 50 provides the first field 53 of the interlaced video signal.

The next three fields of the interlaced video signal are derived from the first motion picture film source frame 51. The odd field produced by scanning the motion picture film source frame 51 provides the second field 54, and the even field produced by scanning the motion picture film source frame 51 provides the third field 55 of the interlaced video signal. Then, the motion picture film source frame 51 is scanned a second time to provide an odd field as the fourth field 56 of the interlaced video signal. The process is repeated with the third frame 57 and the fourth frame 58 of the motion picture film source, except that repeated field is the even field 59, as shown. Note that the interlaced video signal frame consisting of the fourth and fifth fields, and the interlaced video signal frame consisting of the sixth and seventh fields are each derived from two different frames of the motion picture film source.

Thus, although the frame frequency of the motion picture film source is different from the field frequency of the interlaced video signal, the frequencies are made to match by scanning every other frame a third time to generate an additional field. This is the basic principle of the 2-3 pull-down conversion method. The 2-3 pull-down conversion method generates an interlaced video signal in which certain fields, such as the second field 54 and the fourth field 56, are completely identical to one another.

A 2-3 pull-down conversion technique similar to that just described is used when an interlaced video signal having a field rate of 50 Hz is derived from a motion picture film source having a frame rate of 24 Hz. PAL-system and SECAM-system video signals are examples of interlaced video signals with a field rate of 50 Hz. When an interlaced video signal with a field rate of 50 Hz is generated from a motion picture film source with a frame rate of 24 Hz, three fields of the interlaced video signal are derived from every twelfth frame of the motion picture film source, and two fields of the interlaced video signal are derived from all other frames.

In the following description, it will be understood that references to video signals with a picture rate (i.e., field rate or frame rate) of 60 Hz also refer to video signals having a picture rate of 50 Hz, and that references to 2-3 pull down conversion in which a video signal having a picture rate of 60 Hz is derived from a motion picture film source or a compressed video signal with a frame rate of 24 Hz also refer to 2-3 pull down conversion in which a video signal with a picture rate of 50 Hz is derived from a motion picture film source or a compressed video signal with a frame rate of 24 Hz. It is also to be understood that references to picture rates of 24 Hz, 50 Hz, and 60 Hz also encompass corresponding non-integer picture rates.

Because an interlaced video signal generated by 2-3 pull-down conversion includes duplicate fields, some types of apparatus for compressing a digital video signal representing a motion picture detect the duplicate fields in the interlaced video signal having a field rate of 60 Hz. Such types of apparatus perform field rate conversion by removing one of each pair of duplicate fields, and compress the resulting digital video signal in interlaced frames having a frame rate of 24 Hz. This improves the overall efficiency of the compression process. Moreover, to further increase the efficiency of the compression process, the interlaced frames may be compressed either in field mode or in frame mode.

To expand a digital video signal compressed in the way just described, the decoder expands the compressed digital video signal to provide an interlaced digital video signal with a frame rate of 24 Hz. The decoder then performs 2-3 pull down conversion to obtain an interlaced video signal with a field rate of 60 Hz.

If such a decoder is adapted to expand the compressed digital video signal in the manner described to provide a non-interlaced output signal for display on a non-interlaced monitor, such as on a non-interlaced computer monitor, the output signal will be displayed with a high picture quality, close to that of the original motion picture film source with the frame rate of 24 Hz. However, to adapt the decoder to convert the interlaced pictures obtained by expanding the compressed digital video signal into a non-interlaced video signal requires a field rate conversion circuit or the like, which increases the complexity of the decoder.

OBJECTS AND SUMMARY OF THE INVENTION

In view of the foregoing, an object of this invention is to provide a decoder for expanding a compressed digital video signal representing a motion picture. The decoder has a simplified construction, and expands a compressed digital video signal representing a motion picture and having a frame rate of 24 Hz, provides 2-3 pull down conversion, and provides an interlaced or a non-interlace digital video output signal.

Accordingly, the invention provides an apparatus for expanding a compressed digital video signal representing a motion picture to provide a digital video output signal. The compressed digital video signal comprises plural interlaced frames with a frame rate of 24 Hz. The digital video output signal comprises plural pictures with a picture rate of at least 49 Hz. The apparatus comprises a frame memory comprising no more than four pages, each page storing one frame. The apparatus also includes an expander for expanding the compressed digital video signal to derive a reconstructed interlaced frame from each frame of the compressed digital video signal. Finally, the apparatus includes a controller that controls writing of each reconstructed interlaced frame into one page of the frame memory. The controller also controls reading out of the reconstructed interlaced frames stored in the pages of the frame memory to provide the pictures of the digital video output signal. Reading out is controlled to effect 2-3 pull down conversion of the reconstructed interlaced frames stored in the frame memory with a frame rate of 24 Hz to provide the pictures of the digital video output signal with a picture rate of at least 49 Hz.

The digital video output signal may be interlaced signal, and each picture is one field. In this case, the control circuit controls the reading out of the reconstructed interlaced frames stored in the pages of the frame memory so that each reconstructed interlaced frame is read out to provide at least two fields of the digital video output signal.

Alternatively, the digital video output signal may be non-interlaced, and each picture is one frame. In this case, the control circuit controls the reading out of the interlaced reconstructed frames stored in the pages of the frame memory such that each reconstructed interlaced frame is read out at least twice, and the lines of the odd field of each reconstructed interlaced frame are read out alternately with the lines of the even field of the reconstructed interlaced frame to provide one picture of the digital video output signal.

The invention further provides a system for recording a digital video input signal representing a motion picture to provide a compressed digital video signal comprising plural interlaced frames and having a frame rate of 24 Hz. This system is also for expanding the compressed digital video signal to provide a digital video output signal comprising plural pictures and having a picture rate of at least 49 Hz. The system comprises an encoder and a decoder.

The encoder includes a system for deriving from a motion picture film source a non-interlaced digital video signal comprising plural frames and having a frame rate of 24 Hz, and a circuit for performing 2-3 pull-down conversion on the non-interlaced digital video signal to derive an interlaced digital video signal having a frame rate of greater than 24 Hz. A circuit compresses the interlaced digital video signal to provide a compressed digital video signal with a frame rate of greater than 24 Hz. Finally, a circuit reduces the frame rate of the compressed digital video signal with a frame rate of greater than 24 Hz to 24 Hz to provide the compressed digital video signal.

The decoder includes a frame memory comprising no more than four pages, each page storing one frame. The decoder also includes an expander for expanding the compressed digital signal to derive a reconstructed interlaced frame from each frame of the compressed digital video signal. Finally, the apparatus includes a controller that controls writing of each reconstructed interlaced frame into one page of the frame memory, and reading of the reconstructed interlaced frames stored in the pages of the frame memory to provide pictures of the digital video output signal. Reading is controlled to effect 2-3 pull down conversion of the reconstructed interlaced frames stored in the frame memory with a frame rate of 24 Hz to provide the pictures of the digital video output signal with a picture rate of at least 49 Hz.

Finally, the invention provides a method of using a frame memory comprising no more than four pages, each page storing one frame, to expand a compressed digital video signal representing a motion picture to provide a digital video output signal. The compressed digital video signal comprises plural interlaced frames and has a frame rate of 24 Hz. The digital video output signal comprises plural pictures and has a picture rate of at least 49 Hz. In the method, each frame of the compressed digital video signal is expanded to derive a reconstructed interlaced frame, and each reconstructed interlaced frame is written into one page of the frame memory. The reconstructed interlaced frames written in the pages of the frame memory are read out to provide the pictures of the digital video output signal. The page of the frame memory into which each reconstructed interlaced frame is written, and the page from which a reconstructed interlaced frame is read out to provide each picture of the digital video output signal are selected. The number of times each reconstructed interlaced frame is to be read out is selected to effect 2-3 pull down conversion of the reconstructed interlaced frames written in the pages of the frame memory with a frame rate of 24 Hz to provide the pictures of the digital video output signal with a picture rate of at least 49 Hz.

The nature, principle and utility of the invention will become more apparent from the following detailed description when read in conjunction with the accompanying drawings in which like parts are designated by like reference numerals or characters.

BRIEF DESCRIPTION OF THE DRAWINGS

FIGS. 9A and 9B schematically show the relationship between interlaced scanning and non-interlaced scanning.

DETAILED DESCRIPTION OF THE INVENTION

Preferred embodiments of the invention will be described with reference to the drawings.

Figure 1:
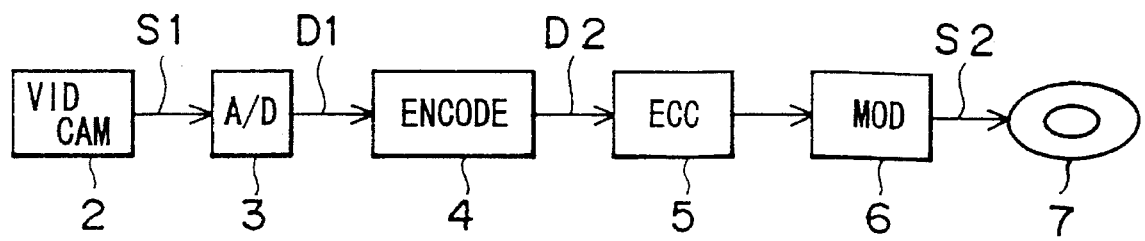
FIG. 1 is a block diagram showing the construction of a conventional apparatus for compressing and recording a digital video signal, such as a digital video signal representing a motion picture.
Figure 6:
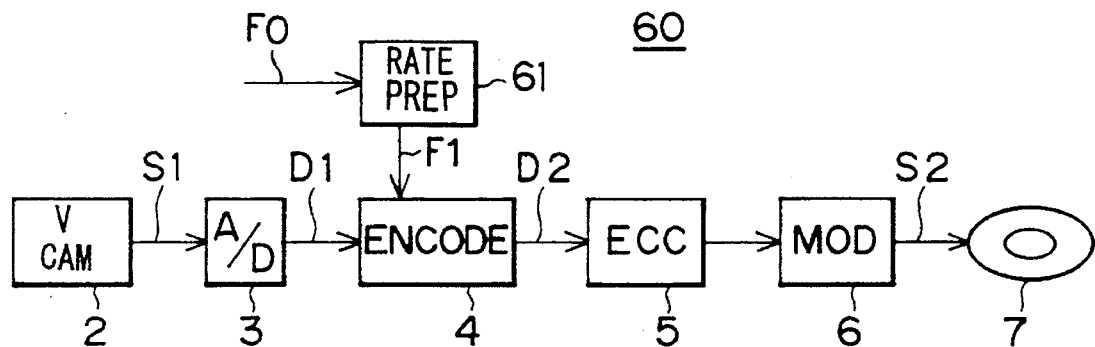
FIG. 6 is a block diagram showing an apparatus for providing the compressed digital video signal for expansion by the reproducing and expanding apparatus incorporating the expander according to the invention.

Referring to FIG. 6, in which components corresponding to those in FIG. 1 are denoted by the same reference numerals, the recording apparatus 60 includes the encoder which generates the compressed digital signal that is expanded by the decoder according to the present invention. In the recording apparatus, instead of the video signal S1 being received from the video camera 2, the digital interlaced video signal F0 having a field rate of 60 Hz, derived from a motion picture film source by 2-3 pull down conversion, is fed into the video input terminal of the field rate preprocessing section 61.

The rate preprocessing section 61 converts the interlaced video signal F0 with a field rate of 60 Hz into the frames of an interlaced video signal F1 with a frame rate of 24 Hz. The interlaced video signal F1 is compressed by the encoder 4 in a manner similar to that described above with reference to the conventional encoder. After the error correction circuit (ECC) 5 had added error correction codes in a similar manner to that described above with reference to the conventional encoder, the modulation circuit 6 modulates the resulting compressed digital video signal D2 a predetermined modulation method. The resulting recording signal S2 is recorded on the recording medium 7, which is, for example, an optical disk.

Figure 2:
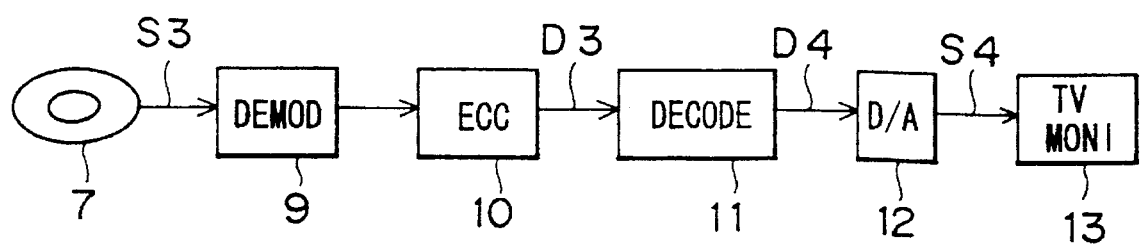
FIG. 2 is a block diagram showing the construction of a conventional apparatus for reproducing and expanding a compressed digital video signal.
Figure 3:
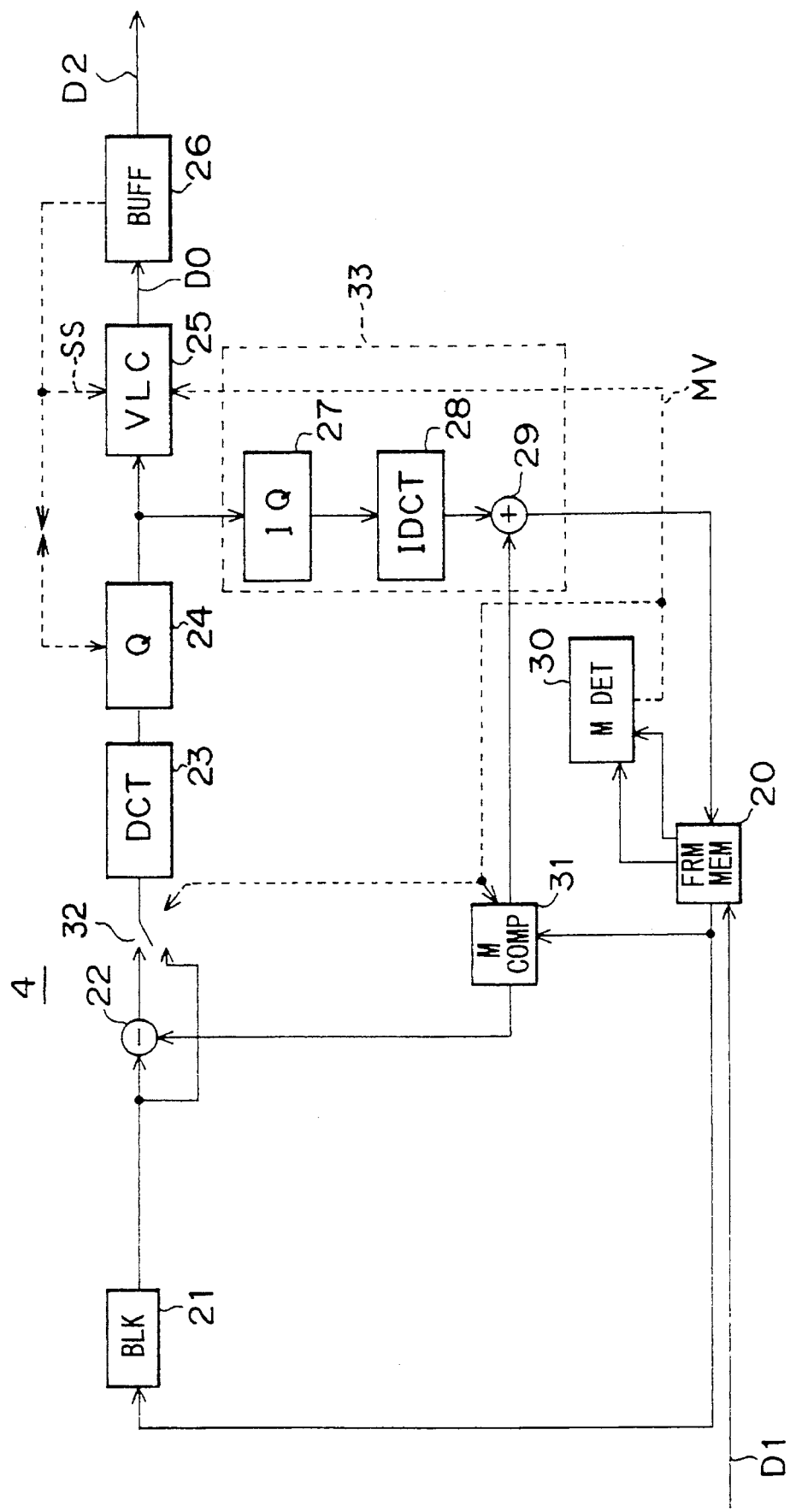
FIG. 3 is a block diagram showing the construction of the encoder of the conventional compressing and recording apparatus shown in FIG. 1.
Figure 7:
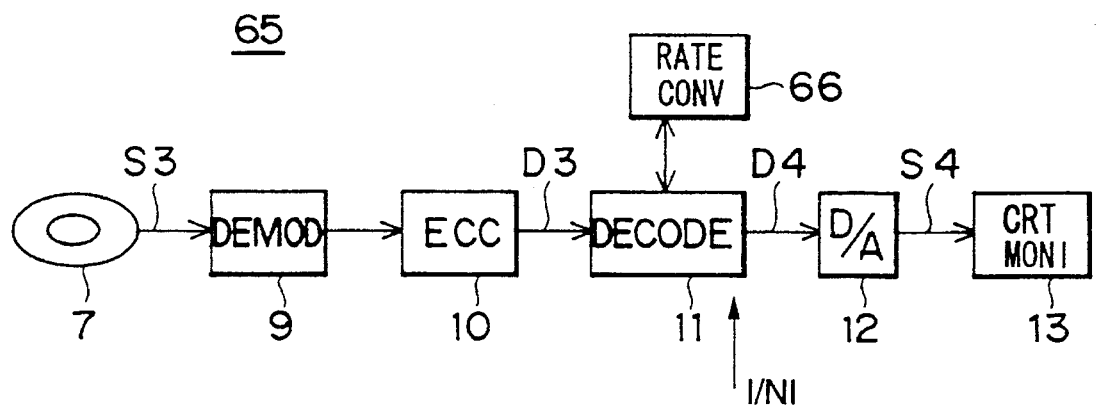
FIG. 7 is a block diagram showing the reproducing and expanding apparatus including the expander according to the invention.

In FIG. 7, in which components corresponding to those shown in FIG. 2 are denoted by the same reference numerals, the reproducing apparatus 65 includes the decoder according to the present invention. In FIG. 7, the signal S3, obtained by reproducing the recording signal from the recording medium 7, is demodulated by the demodulation circuit 9, and error detection and correction is applied by the error correction circuit 10. The decoder 11 receives the resulting compressed digital video signal D3, and from it reconstructs the interlaced frames of the digital video signal at a frame rate of 24 Hz for storage in a multi-page frame memory.

The decoder 11 includes the rate converter 66, which controls the timing of the writing of the reconstructed interlaced frames resulting from the decoding into the pages of the frame memory. The rate converter 66 also controls reading the reconstructed frames from the pages of the frame memory to provide frames of the digital output video signal in such a manner that 2-3 pull down conversion is performed. Finally the rate converter 66 controls conversion of the reconstructed interlaced frames into non-interlaced frames when a non-interlaced signal having a frame rate of 60 Hz is to be provided as the digital video output signal.

The analog-to-digital converter 12 converts the digital video output signal from the decoder 11 into an analog video signal for delivery to the monitor 13 as the video output signal S4. Alternatively, the digital video output signal D4 may be delivered directly to the monitor 13 as the video output signal if the monitor can operate with a digital input signal.

Whether the video output signal is an interlaced video signal or a non-interlaced video signal is selected by a interlace/non-interlace control signal I/NI. The control signal can be entered into the decoder 11 by the user operating an interlace mode control on the decoder, or the control signal can be provided by feeding a signal indicating that the monitor 13 is capable of non-interlaced scanning with a frame rate of 60 Hz from the monitor 13 to the decoder 11 via a suitable signal path (not shown).

Figure 4:
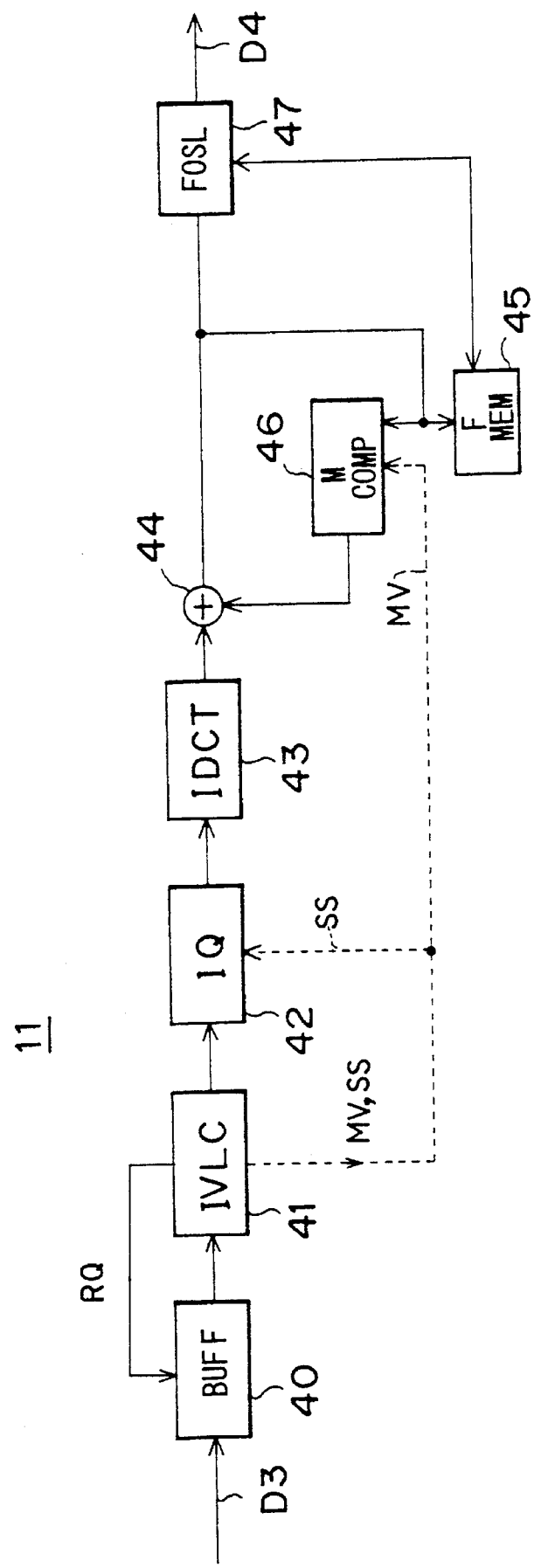
FIG. 4 is a block diagram showing the construction of the decoder in the conventional reproducing and expanding apparatus shown in FIG. 2.
Figure 5:
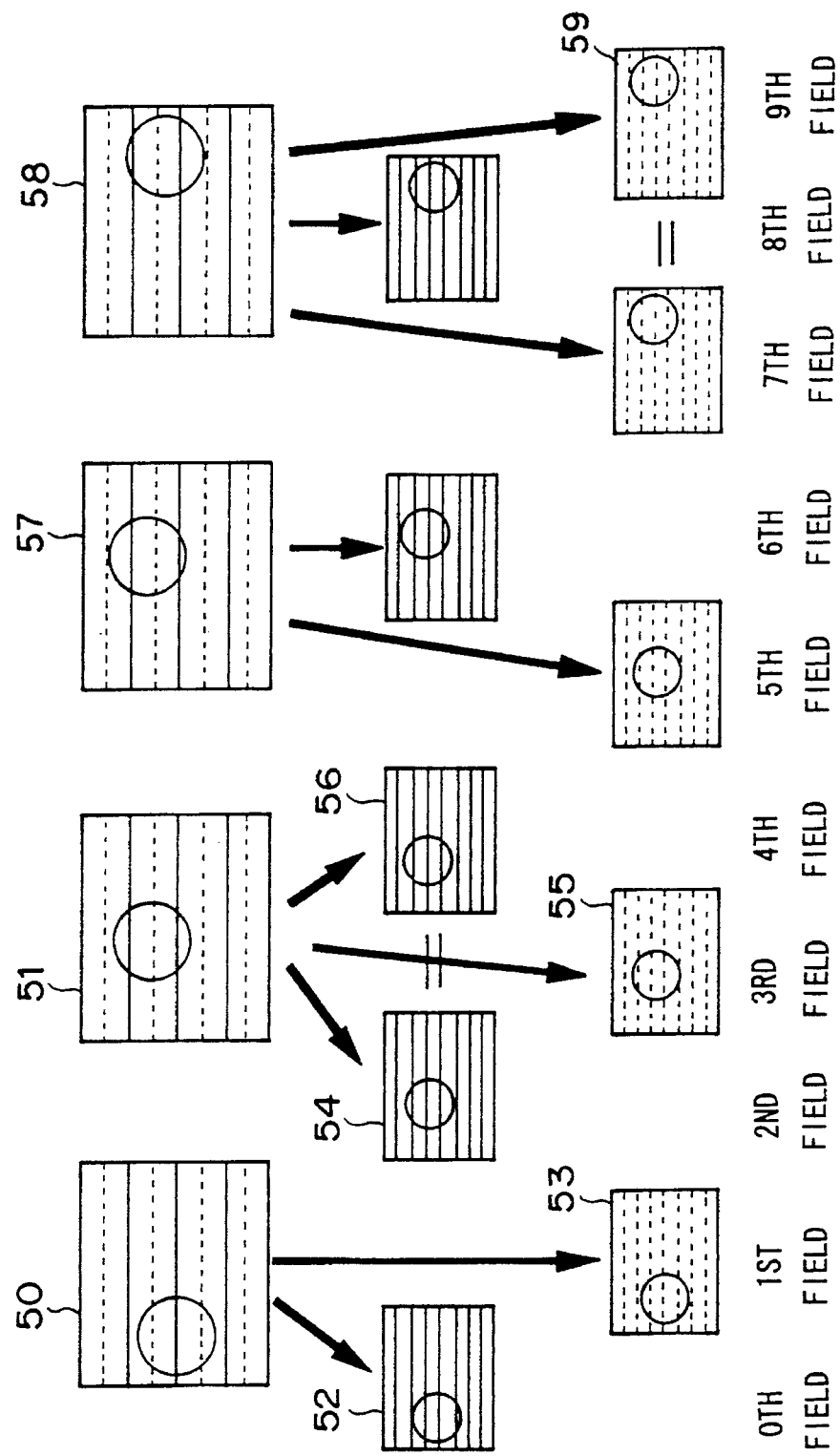
FIGS. 5A and 5B are schematic diagrams explaining the theory of 2-3 pull down conversion.
Figure 8:
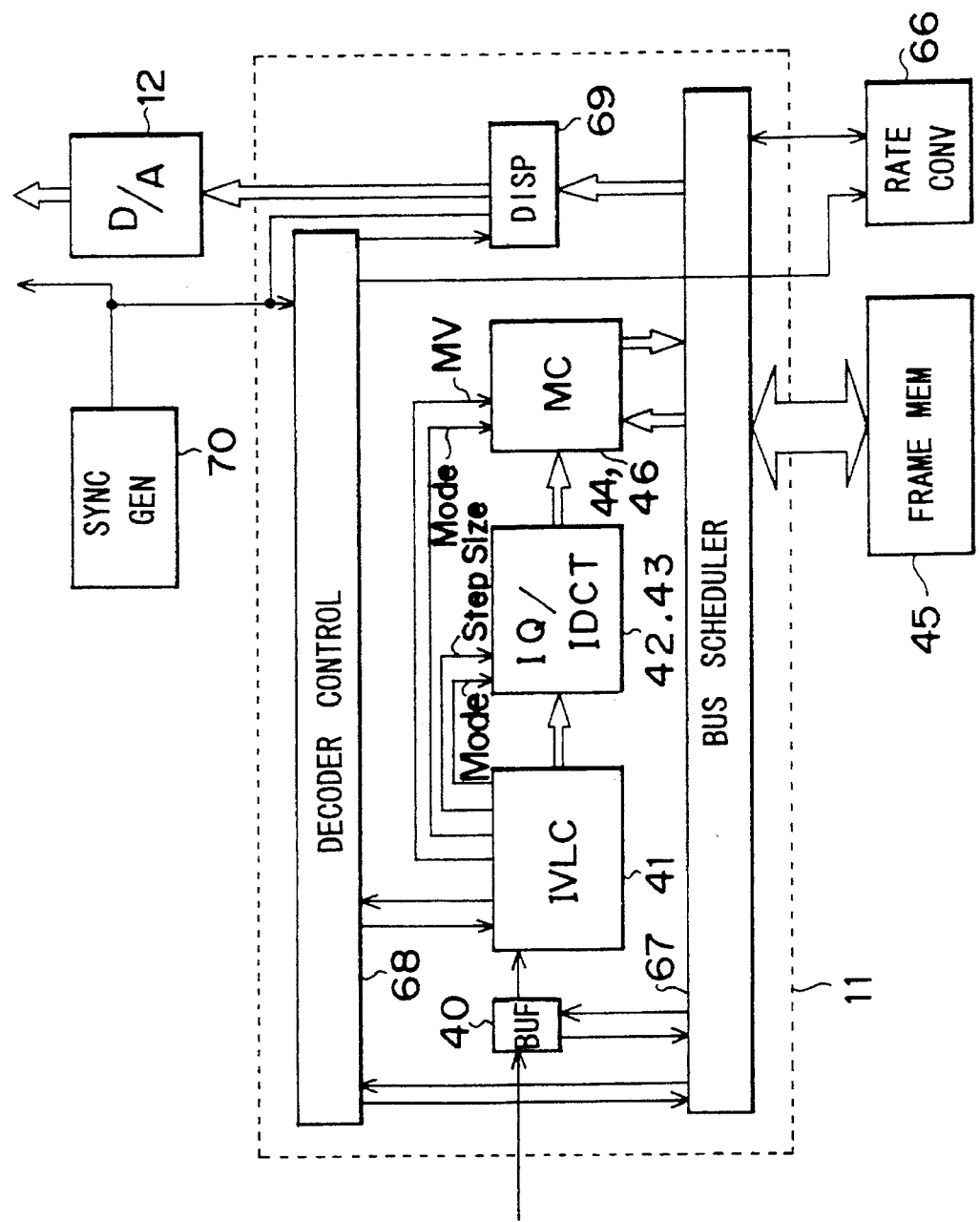
FIG. 8 is a block diagram showing the circuit structure of the decoder according to the invention.

In the reproducing apparatus 65, the decoder 11 is constructed as shown in FIG. 8, in which components corresponding to those in the decoder shown in FIG. 4 are indicated by the same reference numerals. In FIG. 8, the frame memory 45 is constructed with four pages of random access memory (RAM), each storing one interlaced frame reconstructed from the compressed digital video signal. The bus scheduler 67 controls access to the pages of the frame memory 45, as will be described below.

The invention relates to controlling the writing and reading of frames reconstructed from the compressed digital video signal using a conventional decoding procedure into and out of the pages of the frame memory 45. In the conventional decoding procedure used in the decoder according to the invention, inverse VLC processing is first applied to the reproduced compressed digital video signal. Then, an inverse orthogonal transform, such as an inverse DCT, including inverse quantizing is performed. Finally, motion compensation is performed by adding each locally-decoded block received from the inverse orthogonal transform to a block of a reference picture derived from the reconstructed frames stored in the frame memory 45.

In the decoder 11, the rate converter 66 effects conversion of the 24 Hz frame rate of the compressed digital video signal to the 60 Hz frame rate of the non-interlaced digital video output signal or to the 30 Hz frame rate of the interlaced digital video output signal. The rate converter provides information to the bus scheduler 67 to indicate the page of the frame memory 45 into which each reconstructed frame is to be written, the page from which each picture (field or frame) of the digital video output signal is to be read, and the timing of such writing and reading operations.

In practice, when the reconstructed interlaced frames stored in the frame memory 45 are read out to provide the digital video output signal, the processing to derive a non-interlaced digital video output signal is as follows. To generate the non-interlaced digital video output signal, the lines of the odd field and of the even field of each frame stored in the frame memory 45 are read alternately at double the line rate of the interlaced signal, and at the same frame rate as the field rate of the interlaced signal. As shown in FIGS. 9A and 9B, the vertical resolution of the frames of the non-interlaced signal (FIG. 9B) is improved compared with the vertical resolution of each field of the interlaced signal (FIG. 9A).

Figures 10A, 10B:
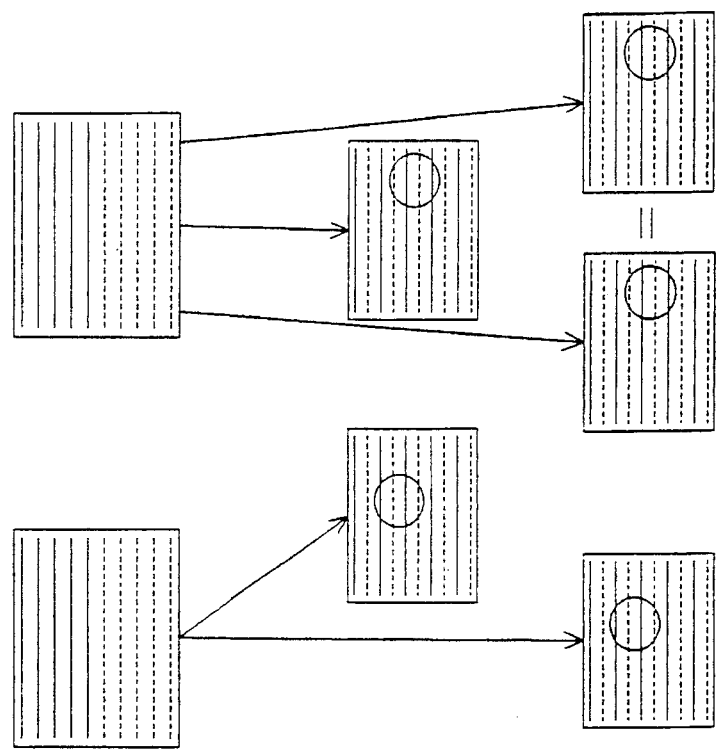
FIGS. 10A and 10B schematically illustrate the combination of 2-3 pull down conversion and non-interlaced scanning.

The result of combining scan conversion processing with 2-3 pull down conversion is shown in FIGS. 10A and 10B, in which the odd field of a regenerated interlaced frame, such as the frame 80, indicated by broken lines in FIG. 10A, is first written into part of page of the frame memory 45. Then, the even field of the interlaced frame 80, indicated by solid lines in FIG. 10A is written into the remainder of the same page of the frame memory. The interlaced frame 81 is similarly written into one page of the frame memory 45.

The interlaced frames 80 and 81 stored in the pages of the frame memory 45 as just described are read out as frames of a non-interlaced digital video output signal as follows. When the frame 80 is read, the lines of the odd field, indicated by the broken lines in FIG. 10B, are read alternately with the lines of the even field, indicated by the solid lines in FIG. 10B, twice at double speed to provide the frames 82 and 83 of the non-interlaced digital video output signal. Each frame is read in 1/60 sec. Then the frame 81 is read out of its page from the frame memory 45. To provide the required 2-3 pull-down conversion, the odd field lines and the even field lines of the frame 81 are alternately read three times to provide the frames 84, 85, and 86 of the digital video output signal. Each of frames 82 through 86 is read in 1/60 sec.

Accordingly, to provide a non-interlaced digital video output signal with a frame rate of 60 Hz, each reconstructed interlaced frame stored in a page of the frame memory 45 is read out at least twice at a frame frequency of 60 Hz. Alternatively, each frame can be read once from the frame memory 45 and the resulting frame stored in another frame memory whence the frame is read a second time and/or a third time. However, this method requires an additional frame memory. Consequently, in this embodiment of the invention, each reconstructed interlaced frame stored in the frame memory 45 is readout at least twice with a frequency of 60 Hz.

Figure 11:
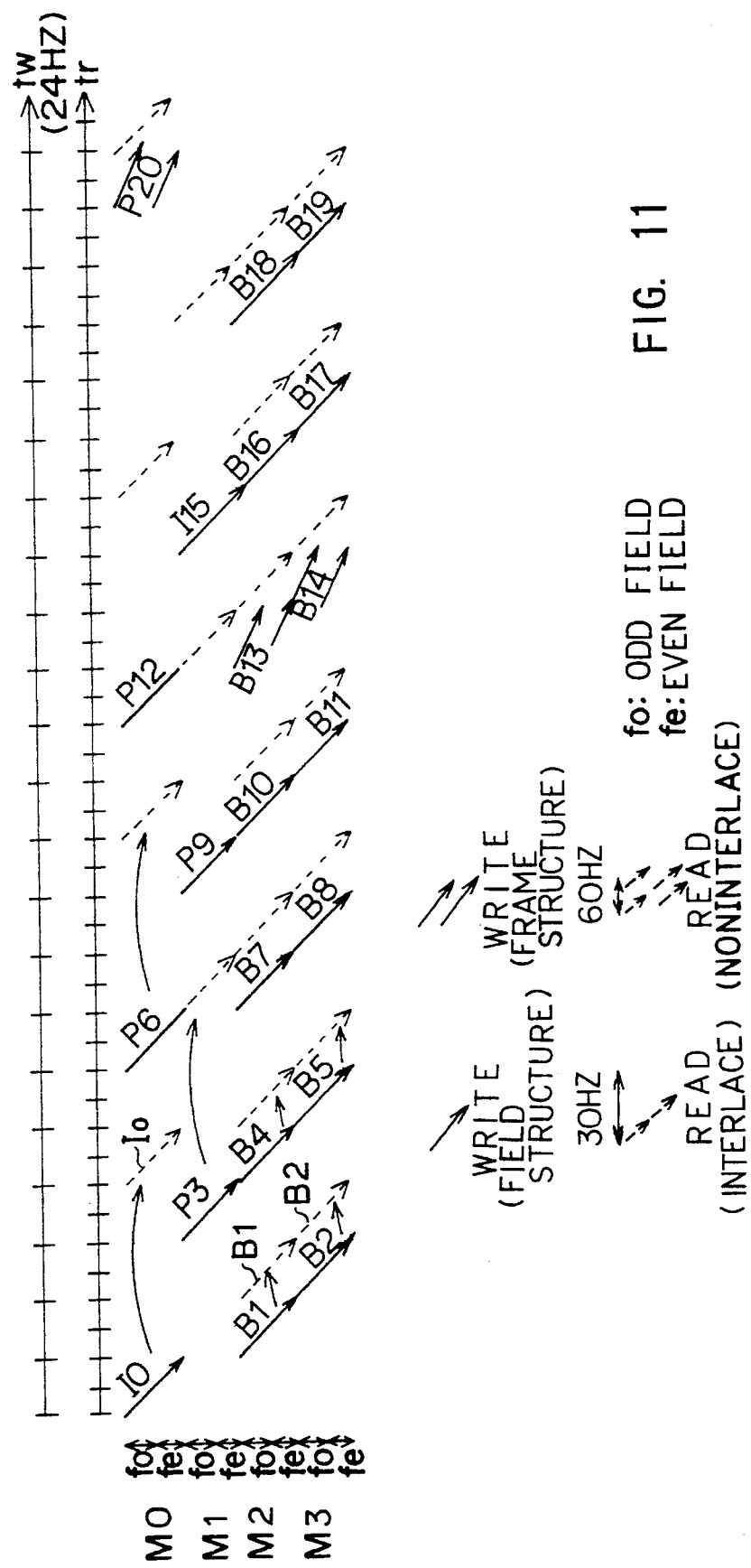
FIG. 11 is a schematic diagram showing the concept of the process by which reconstructed interlaced frames derived from the compressed video signal are written into the pages of the frame memory and are read out to provide the frames of the interlaced digital video output signal.
Figure 12:
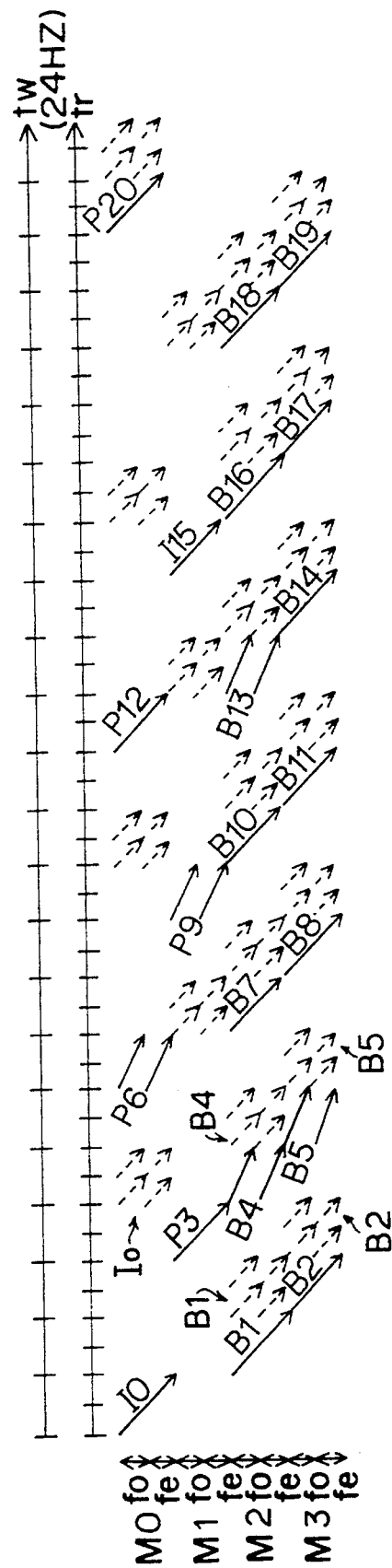
FIG. 12 is a schematic diagram showing the concept of the process by which reconstructed interlaced frames derived from the compressed video signal are written into the pages of the frame memory and are read out to provide the frames of the non-interlaced digital video output signal.
Figure 16:
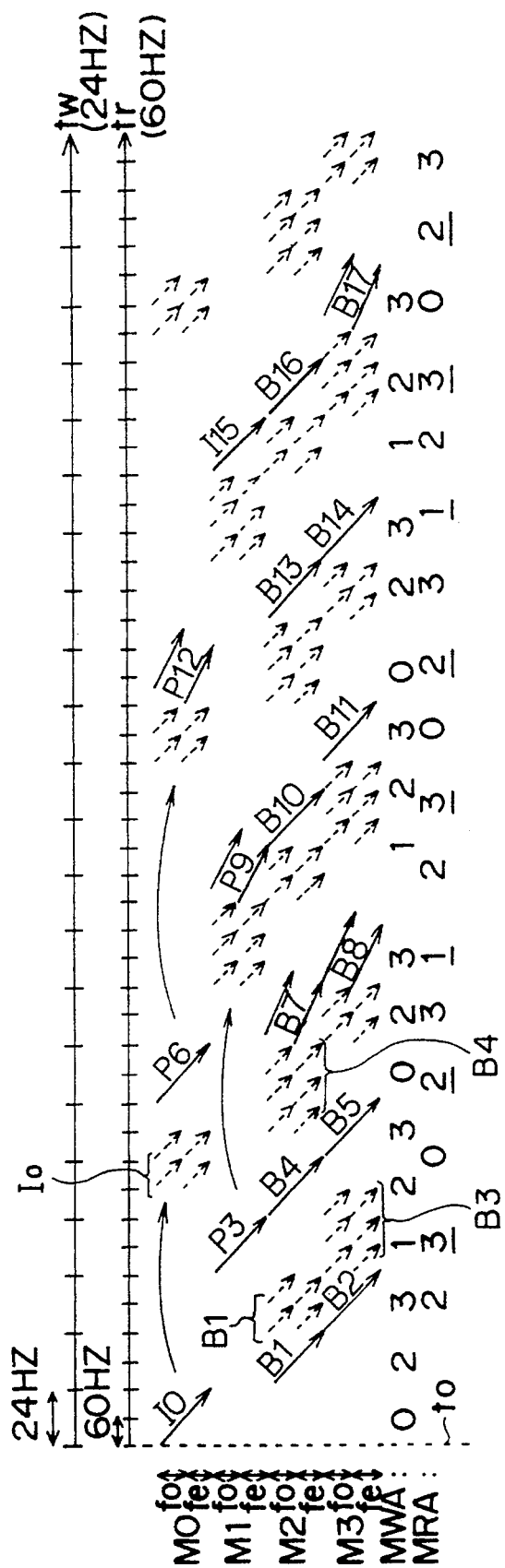
FIG. 16 is a schematic diagram explaining the operation in the non-interlace mode of the rate converter in the decoder according to the invention.
Figure 18:
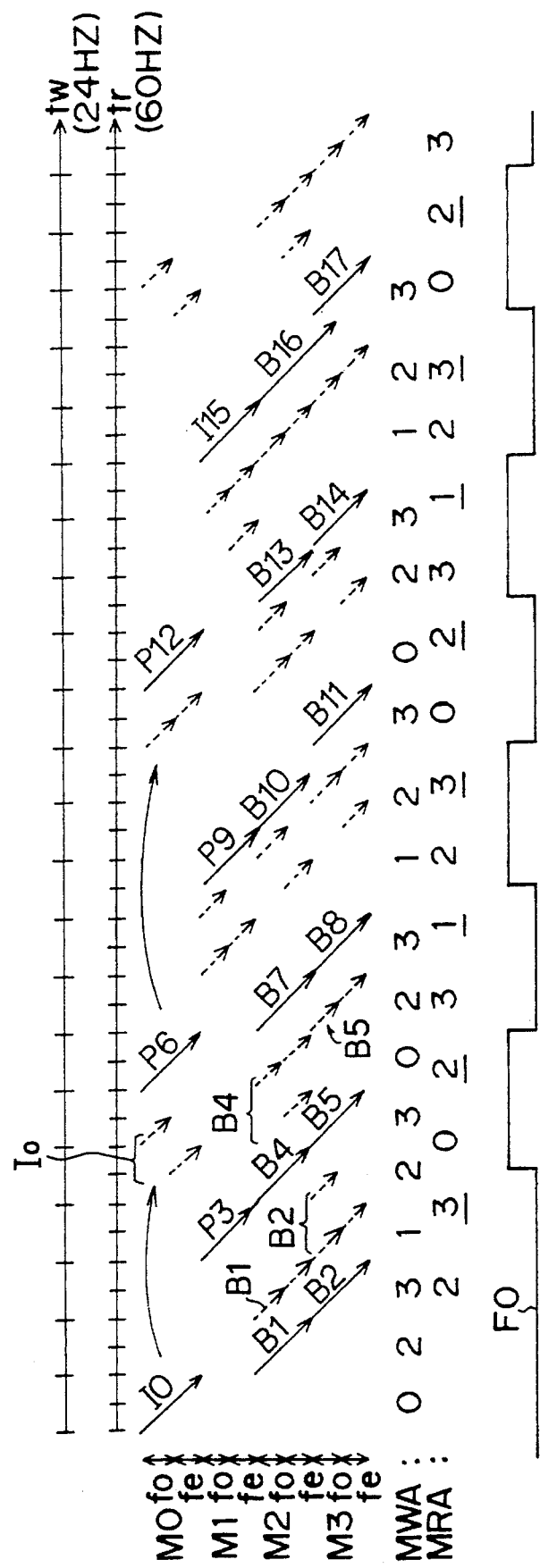
FIG. 18 is a schematic diagram explaining the operation in the interlaced mode of the rate converter in the decoder according to the invention.

FIGS. 11 and 12 show conceptually the reading and writing process according to the invention using, for example, the I-picture, B-picture, and P-picture picture types standardized by the Motion Picture Experts Group (MPEG) method of compressing a digital video signal representing a motion picture for storage. FIGS. 16 and 18 show the reading and writing process with the timing and multiple readings required to implement 2-3 pull-down conversion to provide a digital video output signal with a picture rate of 60 Hz, i.e., an interlaced digital video output signal with a frame rate of 30 Hz or a non-interlace digital video output signal with a frame rate of 60 Hz.

Each frame of the digital video signal may be coded using intra-picture coding or inter-picture coding. An I-picture is a frame coded using intra-picture coding, in which the picture is coded without reference to a previous or a following picture. A P-picture or a B-picture is coded with reference to a reference picture, which is derived from one or more reconstructed previous or following pictures. When a picture is coded using inter-picture coding, the picture may be coded with reference to a reference picture as follows: a P-picture is coded with forward prediction using as its reference picture a temporally-preceding I-picture or P-picture. A B-picture is coded with bi-directional prediction using as its reference picture one of the following three types of pictures: a temporally-preceding I-picture or P-picture; a temporally-following I-picture or P-picture; or a picture formed by interpolation between a temporally-preceding I-picture or P-picture and a temporally-following I-picture or P-picture.

FIG. 11 shows decoded pictures written into the pages of the frame memory 45 in the order of, for example, I-picture, B-picture, B-picture, P-picture, B-picture, B-picture, P-picture, B-picture, B-picture, P-picture, . . . , as indicated by the solid lines labelled I0, B1, B2, P3, B4, B5, P6, B7, B8, P9, . . . respectively. The pictures are read from respective pages of the frame memory 45 to provide the digital video output signal in the order in which they are to be displayed, i.e., in the order of B1, B2, I0, B4, B5, P3, B7, B8, P6, B10, B11, P9, . . .

In FIG. 11, and also in FIGS. 12, 16, and 18, the four pages of the frame memory 45 into which the frames of the reconstructed frames can be written are indicated by M0, M1, M2, and M3. The page of the frame memory into which each of the pictures in the sequence set forth above is written is indicated in FIGS. 11, 12, 16, and 18 by the one of the four rows marked M0 through M3 in which the frame number appears. For example, frame I0 appears in the row marked M0, thus the frame I0 is written into page M0 of the frame memory 45. In addition, each page of the frame memory 45 is divided into an even field portion fe and an odd-field portion fo, also shown in FIGS. 11, 12, 16, and 18 into which the odd field and the even field, respectively, of the frame are written. Finally, an axis showing the relationship between writing time and reading time is displayed at the top of FIGS. 11, 12, 16, and 18. In FIGS. 11 and 12, this axis is not a real time axis.

In the writing and reading sequence shown in FIG. 11, the I-picture I0, indicated by the solid arrow I0, is first written in page M0 of the frame memory 45. Next, the B-picture B1, indicated by the solid arrow B1, is written into page M2 of the frame memory 45; and the following B-picture B2, indicated by the solid arrow B2, is written into page M3 of the frame memory 45. At the same time, the B-picture B1, indicated by the broken arrow B1, is read out from page M2.

Next, the P-picture P3, indicated by the solid arrow P3, is written into page M1 of the frame memory 45, and, at the same time, the B-picture B2, indicated by the broken arrow B2, is read out from the page M3 of the frame memory 45. The B-picture B4, indicated by the solid arrow B4, is written into page M2 of the frame memory 45, and, at the same time, the I-picture I0, indicated by the broken arrow I0, is read out from the page M0 of the frame memory 45. By process of writing and reading similar to that just described, the remaining pictures in the picture sequence are processed.

In the decoding apparatus according to the invention, the frame memory 45 is constructed with only four pages, each storing one frame. No other frame memories are used in the decoder 11 to derive the digital video output signal from the compressed digital signal. Separate pages are designated for storing I-pictures and P-pictures and for storing B-pictures. Only I-pictures and P-pictures are stored in pages M0 and M1 of the frame memory 45; and only B-pictures are stored in pages M2 and M3 of the frame memory 45. Accordingly, when 2-3 pull down conversion is not to be performed, since a page corresponding to each of four frames is provided in the frame memory 45, pictures having both a field structure and a frame structure may be written and read with timings similar to those shown in FIG. 11. This is done by delaying the start of reading from each page of the frame memory by a time corresponding to one frame from the start of writing to the page of the memory. This provides sufficient time, even when an interlaced signal is generated as the digital output video signal.

Providing the frame memory 45 with four pages, each storing one frame, simplifies controlling the memory because, as shown in FIG. 12, reading out from the frame memory to provide a non-interlaced digital video output signal can be done in a manner similar to that for reading out from the frame memory to provide an interlaced digital video output signal.

FIG. 12 shows conceptually the reading and writing sequence when an interlaced signal is read out from the frame memory 45 as the digital video output signal. In FIG. 12, the I-picture I0, indicated by the solid arrow I0, is first written into page M0 of the frame memory 45. Next, the B-picture B1, indicated by the solid arrow B1, is written into page M2 of the frame memory 45; and the following B-picture B2, indicated by the solid arrow B2, is written into page M3 of the frame memory 45. At the same time, the B-picture B1 is read out twice from page M2 of the frame memory 45, as indicated by the four broken arrows B1. The lines of the odd field and of the even field stored in the page M2 are alternately read out to provide one frame of the digital video output signal. Then, the lines of the odd field and of the even field stored in the page M2 are alternately read a second time to provide the next frame of the digital video output signal.

Next, the P-picture indicated P3, by the solid arrow P3, is written into page M1 of the frame memory 45. At the same time, the B-picture B2 is read out twice from page M3 of the frame memory 45, as indicated by the four broken arrows B2. The lines of the odd field and of the even field stored in the page M1 are alternately read out to provide one frame of the digital video output signal. Then, the lines of the odd field and of the even field stored in the page M1 are alternately read a second time to provide the next frame of the digital video output signal.

Next, the B-picture B4, indicated by the solid arrow B4, is written into page M2 of the frame memory 45, and, at the same time, the I-picture I0 is read out twice from page M0 of the frame memory 45, as indicated by the four broken arrows I0. The lines of the odd field and of the even field stored in the page M0 are alternately read out to provide one frame of the digital video output signal. Then, the lines of the odd field and of the even field stored in the page M0 are alternately read a second time to provide the next frame of the digital video output signal.

Figure 13:
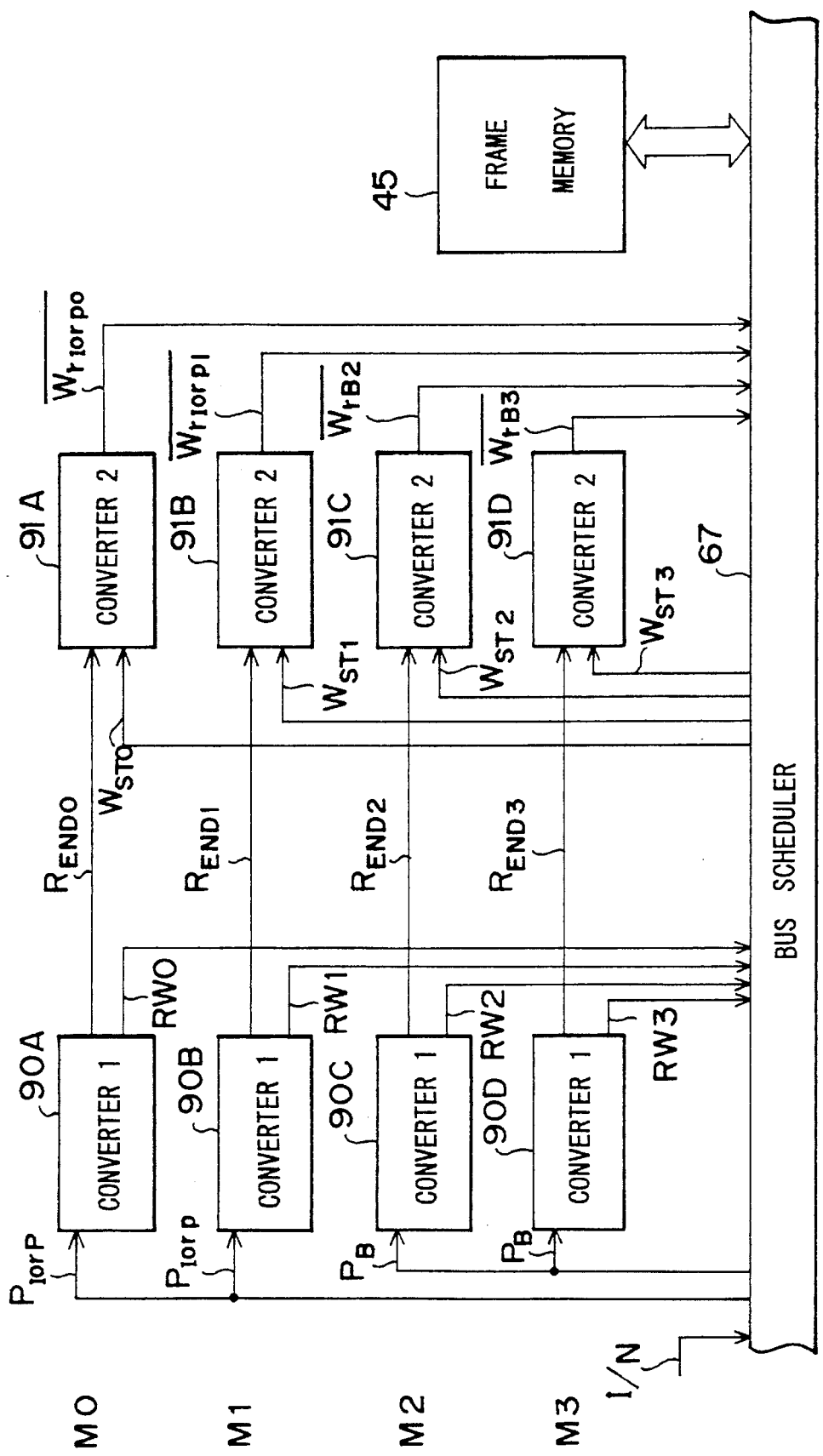
FIG. 13 is a block diagram schematically showing the construction of the rate converter in the decoder according to the invention.

In the decoder according to the invention, the rate converter 66 is constructed as shown in FIG. 13. The rate converter 66 includes the first converters 90A, 90B, 90C, and 90D, which perform 2-3 pull down conversion by designating, via the bus scheduler 67, the page of the frame memory 45 into which each reconstructed interlaced frame is to be written, and from which each picture of the digital video output signal is to be read. The rate converter also includes the second converters 91A, 91B, 91C, and 91D which control the timing of the writing and reading operations.

Figure 14:
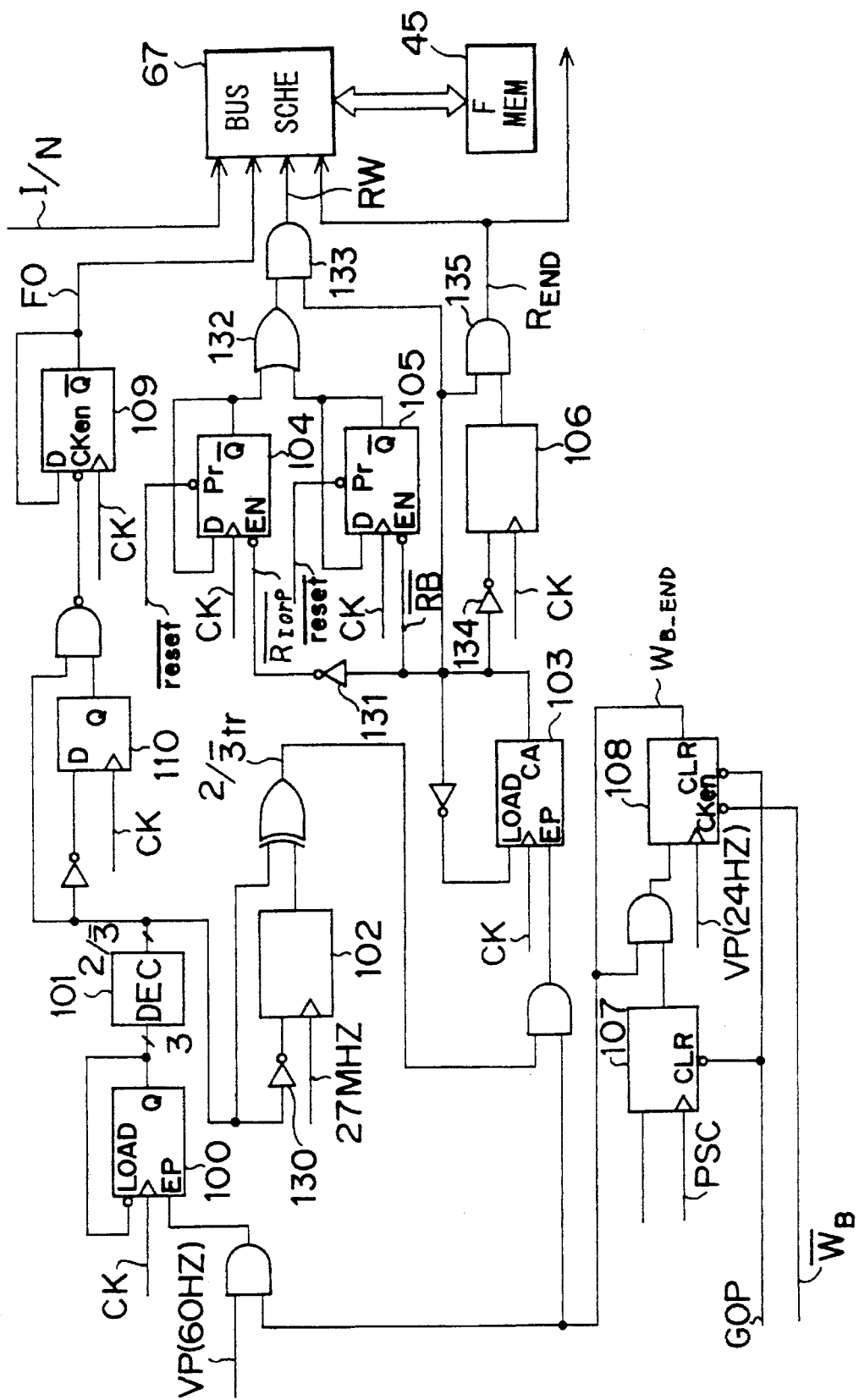
FIG. 14 is a connection diagram showing the construction of the first converter in the rate converter in the decoder according to the invention.
Figure 15:
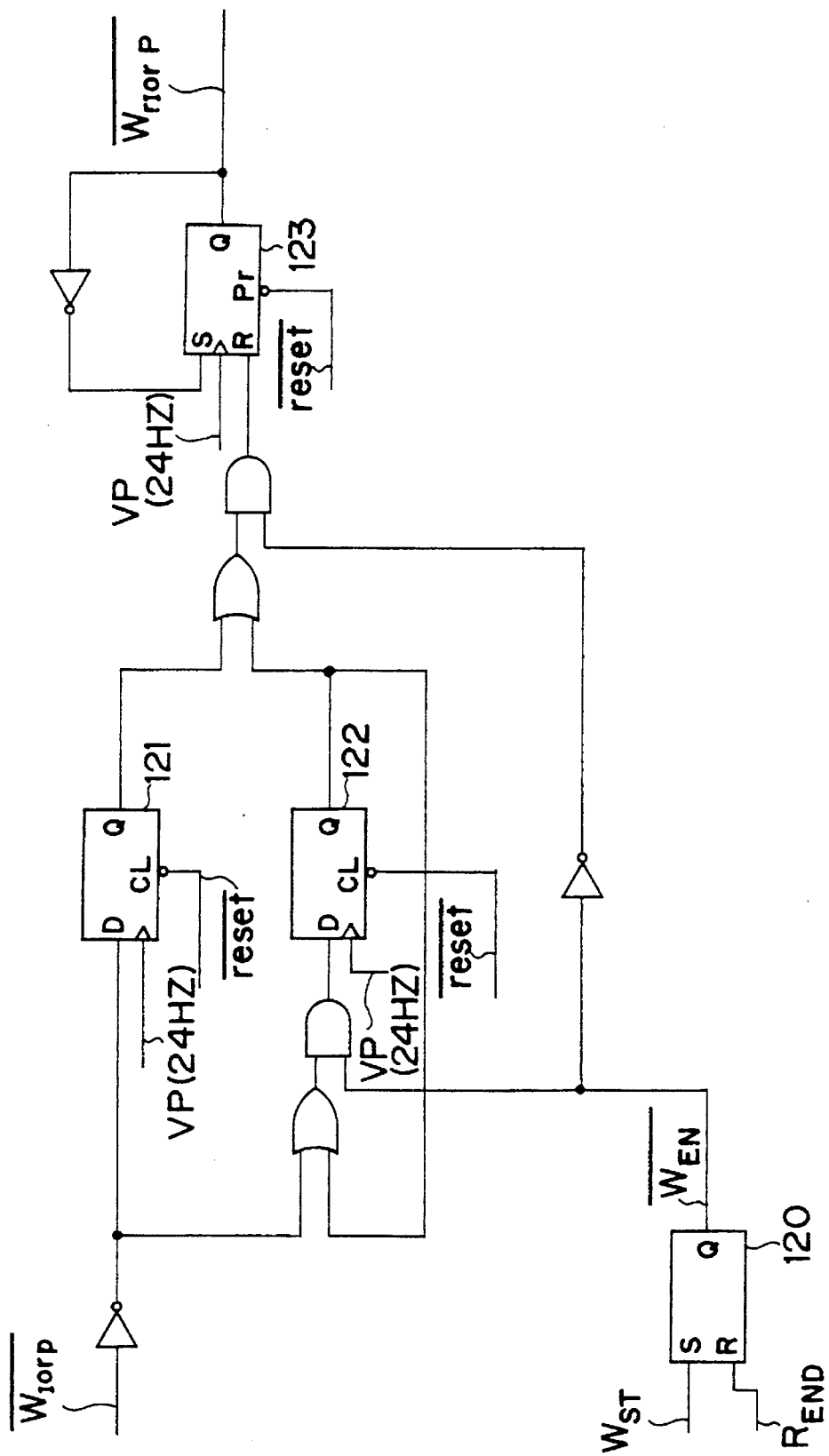
FIG. 15 is a connection diagram showing the construction of the second converter in the rate converter in the decoder according to the invention.

The construction of each of the first converters 90A, 90B, 90C, and 90D is shown in detail in FIG. 14, and that of each of the second converters 91A, 91B, 91C, and 91D is shown in detail in FIG. 15. The converters are constructed from logic gates and flip-flops. The first converters each include the frame counters 100 and 103, the decoder 101, the latches 102, 104, 105, 106, 109, and 110, and the clock counters 107 and 108, etc. One first converter and one second converter is provided for each page of the frame memory 45. In the example shown in FIG. 13, one pair of converters are provided for each of the four pages of the frame memory 45.

Each of the first converters 90A, 90B, 90C, and 90D is initialized by the MPEG group of pictures (GOP) start code, and determines the picture type of each picture by recognizing the MPEG picture start code (PSC).

Circuit operation of the first converter 90B and of the second converter 91B, which controls writing to and reading from the page M1 of the frame memory 45, will be described with reference to FIGS. 14, 15, and 17A through 17K. The construction of the first converters 90A, 90C, and 90D, and of the second converters 91A, 91C, and 91D is the same. The first converters 90A, 90B, 90C, and 90D and the second converters 91A, 91B, 91C, and 91D respectively operate on the memory pages M0, M1, M2, and M3 shown in the lower part of FIG. 16. It should be noted that signal names in the circuit diagrams of FIGS. 14 and 15 correspond to those in FIGS. 17A through 17K.

Figure 17:
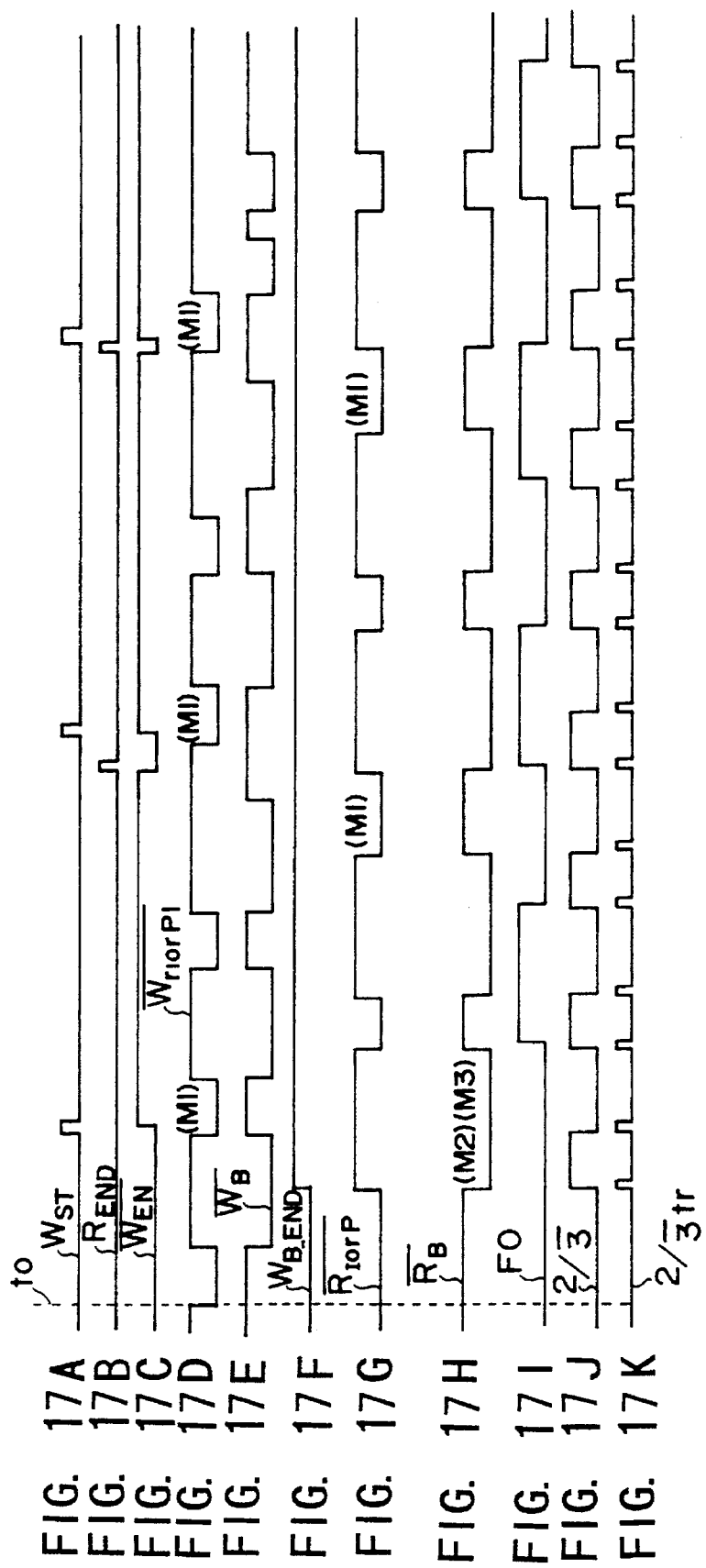
FIGS. 17A to 17K are timing charts explaining an operation in the non-interlace mode of the rate converter in the decoder according to the invention.

The first B-picture B1 in the GOP is written into page M2 of the frame memory 45 when the write enable signal $W\overline{\square}$- (the "-" in $W\overline{\square}$- and in similar designations in the following description indicates the negative and corresponds to the bar in the Figures) of the second converter 91 is active (i.e., is at a low level), as shown in FIG. 17C. While the first B-picture B1 is being written, the signal $W_{B\_END}$ from the latch 108 remains low and inhibits the frame counters 100 and 103.

When writing the first the B-picture B1 is finished, the signal $W_{B\_END}$ from the latch 108 goes high in response to $W\overline{\square}$-, as shown in FIGS. 17E and 17F, which enables the frame counters 100 and 103. The frame counter 100 counts the frames read out of the frame memory 45 at a frame rate of 60 Hz, and the decoder 101 decodes the output of the counter 100 to generate the ⅔-signal, as shown in FIG. 17J.

The ⅔-signal is inverted by the inverter 130 and fed into the latch 102, together with the 27 MHz clock signal to generate the trigger pulse ⅔-tr shown in FIG. 17K. The ⅔-tr trigger pulse starts the counter 103, the output of which is $\overline{\square}$- (FIG. 17H), which is inverted by the inverter 131 to produce $R\overline{\square}$- (FIG. 17G). The signals $\overline{\square}$- and $\overline{\square}$- are the read enable signal for a B-picture and the read enable signal for an I-picture or a P-picture, respectively.

The two read enable signals $R\overline{\square}$- and $\overline{\square}$- are latched by the latches 104 and 105, respectively, the outputs of which are fed into the OR-gate 132. The output of the OR-gate is fed into one input of the AND-gate 133, the other input of which receives the signally $\overline{EQ}$-. The output of the AND-gate 133 is the read/write signal RW, which is fed to the bus scheduler 67. The signal $\overline{EQ}$- is also fed via the inverter 134 into the latch 106, the output of which is fed into one input of the AND-gate 135. The other input of the AND-gate 135 receives $\overline{EQ}$-. The output of the AND-gate 135, the signal $R_{END}$ (FIG. 17A), is also fed to the bus scheduler 67. The signals RW and $R_{END}$ enable writing to and reading from the memory page controlled by the controller, and whose page address is indicated by memory write address MWA and the memory read address MKA in FIG. 16.

In the second converter 91 shown in FIG. 15, the write enable signal $\overline{WQ}$- is generated by the R/S flip-flop 120, which is set by receiving the signal $W_{ST}$, which indicates the start of decoding, and is reset by the signal $R_{END}$ from the first converter 90. The D-type flip-flops 121, 122, and 123 provide a timing reconciling function, to prevent writing until after reading is completed such that writing is executed when $\overline{WQ}$- is low writing to a specific page is enabled when the signal $\overline{WiQ}$- is low or $\overline{WQ}$- for that page is low. In the manner just described, writing and reading for 2-3 pull-down conversion are controlled.

The circuits described control writing to and reading from the pages M0 to M3 of the frame memory 45, as shown in FIG. 16.

FIG. 16 illustrates how reconstructed interlaced frames are stored in pages of the frame memory 45, and how they are read out from the respective pages of the frame memory 45 to provide the pictures, i.e., frames, of a non-interlaced digital video output signal with a frame rate of 60 Hz. In FIG. 16, the I-picture I0, indicated by the solid arrow I0, is written into page M0 of the frame memory 45; then, the B-picture B1, indicated by the solid arrow B1, is written into page M2 of the frame memory 45. Next, the following B-picture B2, indicated by the solid arrow B2, is written into page M3 of the frame memory 45, and at the same time, the B-picture B1 is read out twice from page M2 of the frame memory 45, as indicated by the four broken arrows B1. The lines of the odd field and of the even field stored in the page M3 are alternately read out to provide one frame of the digital video output signal. Then, the lines of the odd field and of the even field stored in the page M3 are alternately read out a second time to provide the next frame of the digital video output signal.

Next, the P-picture P3, indicated by the solid arrow P3, is written into page M1 of the frame memory 45, and, at the same time, the B-picture B2 is read out three times from page M3 of the frame memory 45, as indicated by the six broken arrows B2. The lines of the odd field and of the even field stored in the page M1 are alternately read out to provide one frame of the digital video output signal. Then, the lines of the odd field and of the even field stored in the page M1 are alternately read out a second time to provide the next frame of the digital video output signal. Finally, the lines of the odd field and of the even field stored in the page M1 are alternately read out a third time to provide the next frame of the digital video output signal.

The page of the frame memory 45 from which each picture is read out is indicated in FIG. 16 by the memory read address MRA. Thus, in this example, FIG. 16 shows that the picture B2 is read out from page M3 of the frame memory 45. That the picture B2 is read out three times is indicated in FIG. 16 by the underline under the memory read address.

The B-picture B2 read out with a timing such that the third reading of the picture B2 occurs at the same time as the odd field of the B-picture B4 is written into the page M2, as indicated by the solid line B4. When the even field of the B-picture B4 is written into page M2 of the frame memory 45, the I-picture I0 is read out the first of two times from page M0 of the frame memory 45, as indicated by the four broken arrows I0. The lines of the odd field and of the even field stored in the page M0 are alternately read out to provide one frame of the digital video output signal. Then, the lines of the odd field and of the even field stored in the page M0 are alternately read a second time to provide the next frame of the digital video output signal. Because, for example, the reading of the I-picture I0 starts after the odd field of the B-picture B4 has been written into page M2, the timing of the memory read addresses MRA and that of the memory write addresses MWA is offset by one field in certain frames, as shown in FIG. 16.

The B-picture B5, indicated by the solid line B5, is next written into page M3 of the frame memory 45. The odd field of the B-picture B5 is written at the same time as the second reading of the I-picture I0 from page M0 of the frame memory. The even field of the B-picture B5 is written into page M3 of the frame memory at the same time as the first of three readings of the B-picture B4 from page M2 of the frame memory 45.

By a process similar to that just described, in which each reconstructed interlaced frame is written into one page of the frame memory 45 once at a frame rate of 24 Hz, and in which consecutive pictures of the non-interlaced digital video output signal are read from the pages of the frame memory either twice or three times, the remaining pictures in the picture sequence are processed to provide the non-interlaced digital video output signal with a frame rate of 60 Hz by 2-3 pull-down conversion.

When an interlaced signal is to be read out from the frame memory 45 as the digital video output signal, the reading sequence is as shown in FIG. 18. The order in which the fields of each interlaced frame are read out from their page of the frame memory 45 is controlled by the field order signal FO. When the field order signal FO is low, the odd field of the frame is read out first, followed by the even field. When the field order signal FO is high, the even field of the frame is read out first, followed by the odd field. The field order signal F0 pulse for each page of the frame memory is generated by a respective one of the first converters 90A through 90D (FIG. 13). In the first converter 90B shown as an example in FIG. 14, the field order signal FO is generated from the edges of the ⅔- signal by the D-type flip-flops 110 and 109 (FIG. 17I).

In the sequence shown in FIG. 18, one field of the frames designated by the ⅔- signal is read out a second time to provide the 2-3 pull-down conversion, and hence the required the required field rate. In FIG. 18, the memory read address MRA of those pages of the frame memory from a field is read twice is indicated by an underline. The field order signal FO changes state after each field that is read for a second time.

FIG. 18 illustrates how reconstructed interlaced frames are stored in the four pages of the frame memory, 45, and how the fields of these pictures are read out from the pages of the frame memory 45 to provide the pictures, i.e., fields of the interlaced digital video output signal with a picture rate of 60 Hz, i.e., a field rate of 60 Hz or a frame rate of 30 Hz. In FIG. 18, the I-picture I0, indicated by the solid arrow I0, is written into page M0 of the frame memory 45; then, the B-picture B1, indicated by the solid arrow B1, is written into page M2 of the frame memory 45. Next, the following B-picture B2, indicated by the solid arrow B2, is written into page M3 of the frame memory 45, and at the same time, the odd field followed by the even field of the B-picture B1 are read out from page M2 of the frame memory 45, as indicated by the two broken arrows B1. Each field is read out in 1/60 sec.

Next, the P-picture P3, indicated by the solid arrow P3, is written into page M1 of the frame memory 45, and, at the same time, the odd field followed by the even field of the B-picture B2 are read out from page M3 of the frame memory 45. The odd field of the B-picture B2 is then read out from page M3 of the frame memory a second time. This is indicated by the three broken arrows B2. The field order signal FO changes state while the B-picture B2 is being read out so that when the next picture is read out of the frame memory 45, its even field will be read out first.

The B-picture B2 is read out with a timing such that the second reading of the odd field of the B-picture B2 occurs at the same time as the odd field of the B-picture B4 is written into the page M2, as indicated by the solid line B4. When the even field of the B-picture B4 is written into page M2 of the frame memory 45, the even field of the I-picture I0 is read out from page M0 of the frame memory 45. The odd field of the I-picture I0 is then read out from page M0 of the frame memory 45. The reading out of the I-picture I0 is indicated by the two broken arrows I0. The even field of the I-picture I0 is read first in response to the changed state of the field order signal FO. The second read out of the odd field of the B-picture B2 and the even field of the I-picture I0 form the next frame of the interlaced digital video output signal.

The B-picture B5, indicated by the solid line B5, is written into page M3 of the frame memory 45. The odd field of the B-picture B5 is written at the same time as the odd field of the I-picture I0 is read out from page M0 of the frame memory. The even field of the B-picture B5 is then written into page M3 of the frame memory at the same time as the even field of the B-picture B4 is read out from page M2 of the frame memory 45 a first time.

The P-picture P6, indicated by the solid line P6, is then written into page M0 of the frame memory 45, and, at the same time, the odd field of the B-picture B4 is read out from page M2 of the frame memory 45, followed by a second read out of the even field of the B-picture B4. The odd field of I-picture I0 and the even field of B-picture B4 (first read out) form one frame of the interlaced digital video output signal, and the odd field and the even field (second read out) of the B-picture B4 form the next frame of the interlaced digital video output signal. The state of the field order signal FO changes in the course of reading the B-picture B4, so that the odd field of the B-picture B S, which is the next picture to be read out, will be read out first.

By a process similar to that just described, in which each reconstructed interlaced frame is written into one page of the frame memory 45 once at a frame rate of 24 Hz, and in which consecutive interlaced frames stored in the frame memory are read out from the pages of the frame memory either as two fields or as three fields, the remaining pictures in the picture sequence are processed to provide the interlaced digital video output signal with a field rate of 60 Hz by 2-3 pull-down conversion.

In the encoder/decoder system described above, the frames of the digital video input signal may be coded in field mode, in which frames consisting of fields derived from two consecutive frames of the motion picture film source may be coded as two fields, to improve the compression efficiency.

The decoder according to the invention provides 2-3 pull-down conversion using no more pages of frame memory than are required in a conventional decoder without the ability to perform 2-3 pull-down conversion. Thus, the decoder according to the invention provides expansion of the compressed digital video signal, 2-3 pull-down conversion, and an interlaced or a non-interlaced video output signal using a simplified construction in which additional pages of frame memory are not required.

Further, the decoder according to the invention will provide an interlaced digital video output signal or a non-interlaced digital video output signal simply by controlling the addressing by which the reconstructed pictures stored in the frame memory are read out to provide the digital video output signal, during which process 2-3 pull-down conversion is also carried out. Hence, both scan mode conversion and 2-3 pull-down conversion may be implemented by the same control circuits in the reproducing apparatus in which a compressed digital video signal derived from motion picture film source and having a frame rate of 24 Hz is decoded and subject to 2-3 pull down conversion by means of a simple circuit construction, to provide either an interlaced or a non-interlaced digital video output signal.

Furthermore, the reproducing apparatus including the decoder according to the invention will reproduce a compressed digital video signal derived from a motion film source such as a motion picture film, and the video output signal from the apparatus may be connected, as desired, to an interlaced or a non-interlace television monitor for display. A compressed digital video signal derived from a motion picture film source may be included in a so-called multi-media environment, and the digital video output signal resulting from expanding the compressed digital video signal by the decoder according to the invention may be displayed on a computer monitor in the home or at the office, greatly improving the useability of such systems.

It should be noted that, while the decoding apparatus according to the invention has been described with reference to reproducing and decoding a compressed video signal recorded on an optical disk as the recording medium, the invention is not limited to this, and may be applied to expanding a compressed digital video signal recorded on magnetic tape or on other recording media. Moreover, the decoder according to the invention may also be used for expanding compressed video signals received via a transmission or distribution system such as broadcast television, cable television, telephone, ISDN network, computer network, etc.

It should also be noted that the decoder according to the invention can also be used to apply expansion and 2-3 pull-down conversion to derive an interlaced or a non-interlaced video signal with a field rate or a frame rate, respectively, of 50 Hz from a compressed digital video signal having a frame rate of 24 Hz. To effect such 2-3 pull-down conversion, the decoder 101 (FIG. 14) is reprogrammed to generate the ⅔- signal once every twelve frames written into the frame memory 45, instead of once every two frames written into the frame memory, as in the 60 Hz version. The decoder according to the invention will also operate with non-integral rates close to 24 Hz, 50 Hz, and 60 Hz.

While the invention has been described with reference to the preferred embodiments of the invention, those skilled in the art will understand that various changes and modifications can be made, therefore, to cover in the appended claims all such changes and modifications that fall within the true spirit and scope of the invention.

I claim:

1. Apparatus for expanding a compressed digital video signal representing a motion picture to provide a digital video output signal, the compressed digital video signal including plural interlaced frames and having a frame rate of 24 Hz, the digital video output signal being selectably one of interlaced and non-interlaced in response to an interlace/non-interlace control signal, and including plural pictures having a picture rate of at least 49 Hz, the picture rate being a field rate when the digital video output signal is interlaced and being a frame rate when the digital video output signal is non-interlaced, the apparatus comprising:

expander means, receiving the compressed digital video signal, for expanding each of the frames of the compressed digital video signal to derive a reconstructed interlaced frame therefrom, the expander means deriving successive reconstructed interlaced frames at a frame rate of 24 Hz, and expanding ones of the frames of the compressed digital video signal using respective reference pictures;

a frame memory comprising no more than four pages, each of the pages storing one reconstructed interlaced frame;

writing means for writing each reconstructed interlaced frame from the expander means into one of the pages of the frame memory;

reading means for reading out the reconstructed interlaced frames stored in the pages of the frame memory to provide the pictures of the digital video output signal, and additionally for reading out the reconstructed interlaced frames stored in the pages of the frame memory for feeding to the expander means for use thereby as the reference pictures; and control means for controlling the reading means, the control means:

operating in response to the interlace/non-interlace control signal to cause the reading means to read out the reconstructed interlaced frames stored in the pages of the frame memory to provide an interlaced video signal as the digital video output signal when the interlace/non-interlace control signal has a first state and to provide a non-interlaced video signal as the digital video output signal when the interlace/non-interlace control signal has a second state, and indicating to the reading means each of the pages of the frame memory wherefrom the reconstructed interlaced frame stored therein is to be read out more than once to effect 2–3 pull down conversion of the reconstructed interlaced frames stored in the pages of the frame memory at the frame rate of 24 Hz to provide the pictures of the digital video output signal at the picture rate of at least 49 Hz.

2. The apparatus of claim 1, wherein, when the interlace/non-interlace control signal has the first state, to cause the control means to provide the interlaced video signal as the digital video output signal:

each picture of the interlaced video signal provided as the digital video output signal is one field; and the control means causes the reading means to read out each reconstructed interlaced frame stored in the pages of the frame memory to provide at least two fields of the interlaced video signal provided as the digital video output signal.

3. The apparatus of claim 2, wherein, when the interlaced video signal provided as the digital video output signal has a field rate of about 50 Hz, the control means controls the reading out of the reconstructed interlaced frames stored in the pages of the frame memory, and after the reading means has read out eleven consecutive reconstructed interlaced frames, each to provide two fields of the interlaced video signal provided as the digital video output signal, the control means indicates to the reading means that the page of the frame memory wherefrom the reading means is to read out a twelfth consecutive reconstructed interlaced frame is to be read out to provide three fields of the interlaced video signal provided as the digital video output signal.

4. The apparatus of claim 2, wherein, when the interlaced video signal provided as the digital video output signal has a field rate of about 60 Hz, the control means controls the reading out of the reconstructed interlaced frames stored in the pages of the frame memory, and after the reading means has read out one reconstructed interlaced frame to provide two fields of the interlaced video signal provided as the digital video output signal, the control means indicates to the reading means that the page of the frame memory wherefrom the reading means is to read out a next reconstructed interlaced frame is to be read out to provide three fields of the interlaced video signal provided as the digital video output signal.

5. The apparatus of claim 1, wherein, when the interlace/non-interlace control signal has the second state, to cause the control means to provide the non-interlaced video signal as the digital video output signal:

each picture of the non-interlaced video signal provided as the digital video output signal is one frame;

the reconstructed interlaced frame stored in each of the pages of the frame memory includes an odd field and an even field, each field including plural lines; and the control means causes the reading means to read out the interlaced reconstructed frames stored in the pages of the frame memory such that each of the reconstructed interlaced frames is read out at least twice, each reading out providing one frame of the non-interlaced video signal provided as the digital video output signal, and causes the reading means to read out the lines of the odd field thereof alternately with the lines of the even field thereof to provide each of the pictures of the non-interlaced video signal provided as the digital video output signal.

6. The apparatus of claim 5, wherein, when the non-interlace video signal provided as the digital video output signal has a field rate of about 50 Hz, the control means controls the reading out of the reconstructed interlaced frames stored in the pages of the frame memory, and, after the control means has determined that the reading means has read out eleven consecutive reconstructed interlaced frames, each to provide two frames of the non-interlaced video signal provided as the digital video output signal, the control means indicates to the reading means that the page of the frame memory wherefrom the reading means is to read out a twelfth reconstructed interlaced frame is to be read out to provide three frames of the non-interlaced video signal provided as the digital video output signal.

7. The apparatus of claim 5, wherein, when the non-interlaced video signal provided as the digital video output signal has a field rate of about 60 Hz, the control means controls the reading of the reconstructed interlaced frames stored in the pages of the frame memory, and, after the control means has determined that the reading means has read out one reconstructed interlaced frame to provide two frames of the non-interlace video signal provided as the digital video output signal, the control means indicates to the reading means that the page of the frame memory wherefrom the reading means is to read out a next reconstructed interlaced frame is to be read out to provide three frames of the non-interlaced video signal provided as the digital video output signal.

8. The apparatus of claim 1, wherein:

the control means is additionally for notifying the reading means of the pages of the frame memory wherefrom the reading means is to read out the reconstructed interlaced frames for feeding to the expander means; and the expander means includes:
motion compensation means for deriving the respective reference pictures from the reconstructed interlaced frames received from the reading means, and
means for reconstructing the reconstructed interlaced frames from the frames of the compressed digital video signal and the respective reference pictures derived by the motion compensation means.

9. The apparatus of claim 8, wherein:

the compressed digital video signal additionally includes motion vectors;

the apparatus additionally comprises demultiplexing means for extracting the motion vectors from the compressed digital video signal; and the motion compensation means derives the reference pictures from the reconstructed interlaced frames received from the reading means in response to the motion vectors extracted from the compressed digital video signal by the demultiplexing means.

10. The apparatus of claim 1, wherein:

the control means comprises:
first converter means for:
generating a write mode signal indicating the one of the page of the frame memory wherein to each reconstructed interlaced frame received from the expander means is to be written; and
generating a read mode signal indicating the one of the pages of the frame memory wherefrom each reconstructed interlaced frame is to be read out to provide at least one of the pictures of the digital video output signal, and
second converter means, coupled to the first converter means, for controlling timing of the write mode signal and the read mode signal for each of the pages of the frame memory;

the control means is additionally for feeding the write mode signal to the writing means to cause the writing means to write each reconstructed interlaced frame received from the expander means into the one of the pages of the frame memory indicated by the write mode signal; and the control means is additionally for feeding the read mode signal to the reading means to cause the reading means to read out, as at least one of the pictures of the digital video output signal, the reconstructed interlaced frame stored in the one of the pages of the frame memory indicated by the read mode signal.

11. The apparatus of claim 10, wherein the first converter means is for generating the read mode signal more than once to indicate to the reading means the pages of the frame memory wherefrom the reconstructed interlaced frame stored therein is to be read out more than once.

12. The apparatus of claim 10, wherein the first converter means is additionally for generating a signal for feeding to the reading means to cause the reconstructed interlaced frame stored in the one of the pages of the frame memory to be read out as more than two pictures.

13. A system for compressing a digital video input signal representing a motion picture to provide a compressed digital video signal including plural interlaced frames having a frame rate of 24 Hz, and for expanding the compressed digital video signal to provide a digital video output signal, the digital video output signal being selectably one of interlaced and non-interlaced in response to an interlace/non-interlace control signal, and including plural pictures having a picture rate of at least 49 Hz, the picture rate being a field rate when the digital video output signal is interlaced and being a frame rate when the digital video output signal is non-interlace, the system comprising:

an encoder, including:
deriving means for deriving an interlaced digital video signal having a frame rate greater than 24 Hz from a motion picture film source comprising plural frames having a frame rate of 24 Hz, the deriving means performing 2–3 pull-down conversion, and
compressor means for compressing the interlaced digital video signal having a frame rate of greater than 24 Hz to provide the compressed digital video signal with the frame rate of 24 Hz; and a decoder, including:
expander means, receiving the compressed digital video signal, for expanding each of the frames of the compressed digital signal to derive a reconstructed interlaced frame therefrom, the expander means deriving successive reconstructed interlaced frames at a frame rate of 24 Hz, and expanding ones of the frames of the compressed digital video signal using respective reference pictures,
a frame memory comprising no more than four pages, each of the pages storing one reconstructed interlaced frame,
writing means for writing each reconstructed interlaced frame from the expander means into one of the pages of the frame memory,
reading means for reading out the reconstructed interlaced frames stored in the pages of the frame memory to provide the pictures of the digital video output signal, and additionally for reading out the reconstructed interlaced frames stored in the pages of the frame memory for feeding to the expander means for use thereby as the reference pictures, and
control means for controlling the reading means, the control means:
operating in response to the interlace/non-interlace control signal to cause the reading means to read out the reconstructed interlaced frames stored in the pages of the frame memory to provide an interlaced video signal as the digital video output signal when the interlace/non-interlace control signal has a first state and to provide a non-interlace video signal as the digital video output signal when interlace control signal has a second state; and
indicating to the reading means each of the pages of the frame memory wherefrom the reconstructed interlaced frame stored therein is to be read out more than once to effect 2–3 pull down conversion of the reconstructed interlaced frames stored in the pages of the frame memory at the frame rate of 24 Hz to provide the pictures of the digital video output signal at the picture rate of at least 49 Hz.

14. The system of claim 13, wherein, when the interlace/non-interlace control signal has the first state, to cause the control signal to provide the interlaced video signal as the digital video output signal:
- each picture of the interlaced video signal provided as the digital video output signal is one field; and
- in the decoder, the control means causes the reading means to read out each reconstructed interlaced frame stored in the pages of the frame memory to provide at least two fields of the interlaced video signal provided as the digital video output signal.

15. The system of claim 13, wherein, when the interlace/non-interlace control signal has the second state, to cause the control means to provide the non-interlaced video signal as the digital video output signal:
- each picture of the non-interlaced video signal provided as the digital video output signal is one frame; and
- in the decoder:
  - the reconstructed interlaced frame stored in each of the pages of the frame memory includes an odd field and an even field, each field including plural lines, and
  - the control means causes the reading means to read out the interlaced reconstructed frames stored in the pages of the frame memory such that each of the reconstructed interlaced frames is read out at least twice, each reading out providing one frame of the non-interlace video signal provided as the digital video output signal, and causes the reading means to read out the lines of the odd field thereof alternately with the lines of the even field thereof to provide each of the pictures of the non-interlaced video signal provided as the digital video output signal.

16. The system of claim 13, wherein, in the decoder:
- the control means is additionally for notifying the reading means of the pages of the frame memory wherefrom the reading means is to read out the reconstructed interlaced frames for feeding to the expander means; and
- the expander means includes:
  - motion compensation means for deriving the respective reference pictures from the reconstructed interlaced frames received from the reading means, and
  - means for reconstructing the reconstructed interlaced frames from the frames of the compressed digital video signal and the respective reference pictures derived by the motion compensation means.

17. The system of claim 16, wherein:
- in the encoder, the compressor means includes means for generating motion vectors and for including the motion vectors in the compressed digital video signal;
- the decoder additionally comprises demultiplexing means for extracting the motion vectors from the compressed digital video signal; and
- in the decoder, the motion compensation means derives the reference pictures from the reconstructed interlaced frames received from the reading means in response to the motion vectors extracted from the compressed digital video signal by the demultiplexing means.

18. The system of claim 13, wherein, in the decoder:
- the control means comprises:
  - first converter means for:
    - generating a write mode signal indicating the one of the pages of the frame memory whereinto each reconstructed interlaced frame received from the expander means is to be written; and
    - generating a read mode signal indicating the one of the pages of the frame memory wherefrom each reconstructed interlaced frame is to be read out to provide at least one of the pictures of the digital video output signal, and
  - second converter means, coupled to the first converter means, for controlling timing of the write mode signal and the read mode signal for each of the pages of the frame memory:
- the control means is additionally for feeding the write mode signal to the writing means to cause the writing means to write each reconstructed interlaced frame received from the expander means into the one of the pages of the frame memory indicated by the write mode signal; and
- the control means is additionally for feeding the read mode signal to the reading means to cause the reading means to read out, as at least one of the pictures of the digital video output signal, the reconstructed interlaced frame stored in the one of the pages of the frame memory indicated by the read mode signal.

19. A method of using a frame memory comprising no more than four pages, each page storing one frame, to expand a compressed digital video signal representing a motion picture to provide a digital video output signal, the compressed digital video signal including plural interlaced frames having a frame rate of 24 Hz, the digital video output signal being selectably one of interlaced and non-interlaced in response to an interlace/non-interlace control signal, and including plural pictures having a picture rate of at least 49 Hz, the picture rate being a field rate when the digital video output signal is interlaced and being a frame rate when the digital video output signal is non-interlaced, the method comprising steps of:
- expanding each of the frames of the compressed digital video signal to derive therefrom a reconstructed interlaced frame, successive reconstructed interlaced frames being derived at a frame rate of 24 Hz, ones of the frames of the compressed digital video signal being expanded using respective reference pictures;
- writing each reconstructed interlaced frame into one of the pages of the frame memory;
- reading out the reconstructed interlaced frames written in the pages of the frame memory to provide the pictures of the digital video output signal, and additionally reading out the reconstructed interlaced frames written in the pages of the frame memory for use as the reference pictures in the expanding step;
- selecting the page of the frame memory whereinto each reconstructed interlaced frame is written in the writing step, and selecting the page wherefrom each reconstructed interlaced frame is read out in the reading step;
- controlling the reading step in response to the interlace/non-interlace control signal to cause the reconstructed interlaced frames stored in the pages of the frame memory to be read out to provide an interlaced video signal as the digital video output signal when the interlace/non-interlace control signal has a first state and to provide a non-interlaced video signal as the digital video output signal when the interlace/non-interlace control signal has a second state; and
- additionally controlling the reading step by indicating each of the pages of the frame memory wherefrom the reconstructed interlaced frame stored therein is to be read more than once to effect 2–3 pull down conversion of the reconstructed interlaced frames written in the pages of the frame memory at the frame rate of 24 Hz to provide the pictures of the digital video output signal at the picture rate of at least 49 Hz.

20. The method of claim 19, wherein, when the interlace/non-interlace control signal has the first state, to cause the control means to provide the interlaced video signal as the digital video output signal:

each picture of the interlaced video signal provided as the digital video output signal is one field;

in the step of writing each reconstructed interlaced frame into one of the pages of the frame memory, each reconstructed interlaced frame is written as an odd field and an even field;

in the step of additionally controlling the reading step, each field of each reconstructed interlaced frame is read out at least twice; and in the step of controlling the reading step in response to the interlace/non-interlace control signal, the reading step is controlled to read out the odd field and the even field of each reconstructed interlaced frame sequentially each to provide at least two fields of the interlaced video signal provided as the digital video output signal.

21. The method of claim 19, wherein, when the interlace/non-interlace control signal has the second state, to cause the control means to provide the non-interlaced video signal as the digital video output signal:

each picture of the non-interlaced video signal provided as the digital video output signal is one frame;

in the step of writing each reconstructed interlaced frame into one of the pages of the frame memory, the reconstructed frame is written as an odd field and an even field, each field including plural lines;

in the step of additionally controlling the reading step, each reconstructed interlaced frame is read out at least twice, each reading out of the reconstructed interlaced frame providing a respective frame of the non-interlaced video signal provided as the digital video output signal; and in the step of controlling the reading step in response to the interlace/non-interlace control signal, the reading step is controlled to read out the lines of the odd field of each reconstructed interlaced frame alternately with the lines of the even field thereof to provide each of the pictures of the non-interlaced video signal provided as the digital video output signal.

22. The method of claim 19, wherein:

the method additionally comprises a step of identifying the pages of the frame memory wherefrom the reading step is to read out the reconstructed interlaced frames for use as the reference pictures in the expanding step; and the step of expanding the compressed digital signal includes steps of:

deriving the respective reference pictures from the reconstructed interlaced frames read out by the reading step for use as the reference pictures, and reconstructing the reconstructed interlaced frames from the frames of the compressed digital video signal and the respective reference pictures derived in the deriving stop.

23. The method of claim 22, wherein:

the compressed digital video signal additionally includes motion vectors;

the method additionally comprises a step of extracting the motion vectors from the compressed digital video signal; and in the step of deriving the respective reference pictures from the reconstructed interlaced frames, the reference pictures are derived from the reconstructed interlaced frames read out by the reading step for use as the reference pictures in response to the motion vectors extracted from the compressed digital video signal by the extracting step.

24. The method of claim 19, wherein:

the selecting step comprises steps of:

generating a write mode signal indicating the one of the pages of the frame memory whereinto each reconstructed frame derived in the expanding step is to be written, generating a read mode signal indicating the one of the pages of the frame memory wherefrom each reconstructed frame is to be read out to provide at least one picture of the digital video output signal, and controlling timing of the steps of generating the write mode signal and generating the read mode signal for each of the pages of the frame memory;

in the step of writing each reconstructed interlaced frame, each reconstructed interlaced frame derived by the expanding step is written into the one of the pages of the frame memory indicated by the write mode signal; and in the step of reading out the reconstructed interlaced frames, each reconstructed interlaced frame is read out as at least one picture of the digital video output signal from the one of the pages of the frame memory indicated by the read mode signal.

\* \* \* \* \*